US007333726B2

(12) United States Patent
Kenny et al.

(10) Patent No.: US 7,333,726 B2
(45) Date of Patent: Feb. 19, 2008

(54) METHOD AND SYSTEM FOR SUPPORTING MULTIPLE SERVICE PROVIDERS WITHIN A SINGLE OPTICAL NETWORK

(75) Inventors: John J. Kenny, Suwanee, GA (US); James O. Farmer, Lilburn, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 635 days.

(21) Appl. No.: 10/699,614

(22) Filed: Oct. 30, 2003

(65) Prior Publication Data

US 2004/0141747 A1 Jul. 22, 2004

Related U.S. Application Data

(63) Continuation-in-part of application No. 09/899,410, filed on Jul. 5, 2001, now Pat. No. 6,973,271.

(60) Provisional application No. 60/422,154, filed on Oct. 30, 2002.

(51) Int. Cl.
 *H04B 10/00* (2006.01)
(52) U.S. Cl. .......................................... 398/72; 398/67
(58) Field of Classification Search ............. 398/66–73
 See application file for complete search history.

(56) References Cited

U.S. PATENT DOCUMENTS

| 4,500,990 A | 2/1985 | Akashi |
| 4,665,517 A | 5/1987 | Widmer |
| 4,763,317 A | 8/1988 | Lehman et al. |
| 4,956,863 A | 9/1990 | Goss |
| 4,975,899 A | 12/1990 | Faulkner |
| 5,132,992 A | 7/1992 | Yurt et al. |
| 5,179,591 A | 1/1993 | Hardy et al. |
| 5,247,347 A | 9/1993 | Litteral et al. |
| 5,249,194 A | 9/1993 | Sakanushi |

(Continued)

FOREIGN PATENT DOCUMENTS

EP 0713347 A2 5/1996

(Continued)

OTHER PUBLICATIONS

Partial International Search Report dated Jan. 3, 2003 for PCT/US01/31032.

(Continued)

*Primary Examiner*—Agustin Bello
(74) *Attorney, Agent, or Firm*—King & Spalding LLP

(57) ABSTRACT

Analog video signals are communicated from multiple service providers to subscribers by using analog optical carriers. Unlike digital optical carriers that typically support data services or IP TV, analog optical carriers that can be demodulated or translated back into the analog radio-frequency (RF) signals do not require additional and costly hardware for reception by a RF receiving device such as a television (TV) set. With the present invention, a TV set does not need significant digital hardware such as a digital set top box to allow the TV set to view video signals from a desired service provider. The present invention can allow a plurality of competing service providers to offer video services to a subscriber through a single optical network.

73 Claims, 18 Drawing Sheets

U.S. PATENT DOCUMENTS

| | | | |
|---|---|---|---|
| 5,253,250 A | 10/1993 | Schlafer et al. | |
| 5,253,275 A | 10/1993 | Yurt et al. | |
| 5,325,223 A | 6/1994 | Bears | |
| 5,345,504 A | 9/1994 | West, Jr. | |
| 5,349,457 A | 9/1994 | Bears | |
| 5,365,588 A | 11/1994 | Bianco et al. | |
| 5,412,498 A | 5/1995 | Arstein et al. | |
| 5,469,507 A | 11/1995 | Canetti et al. | |
| 5,510,921 A | 4/1996 | Takai et al. | |
| 5,528,582 A * | 6/1996 | Bodeep et al. | 370/276 |
| 5,534,912 A | 7/1996 | Kostreski | |
| 5,541,917 A | 7/1996 | Farris | |
| 5,550,863 A | 8/1996 | Yurt et al. | |
| 5,557,317 A | 9/1996 | Nishio et al. | |
| 5,559,858 A | 9/1996 | Beveridge | |
| 5,572,347 A | 11/1996 | Burton et al. | |
| 5,572,348 A | 11/1996 | Carlson et al. | |
| 5,572,349 A | 11/1996 | Hale et al. | |
| 5,666,487 A | 9/1997 | Goodman et al. | |
| 5,694,232 A * | 12/1997 | Parsay et al. | 398/42 |
| 5,701,186 A | 12/1997 | Huber | |
| 5,706,303 A | 1/1998 | Lawrence | |
| RE35,774 E | 4/1998 | Moura et al. | |
| 5,778,017 A | 7/1998 | Sato et al. | |
| 5,790,523 A | 8/1998 | Ritchie, Jr. et al. | |
| 5,793,413 A | 8/1998 | Hylton et al. | |
| 5,802,089 A | 9/1998 | Link | |
| 5,861,966 A | 1/1999 | Ortel | |
| 5,867,485 A * | 2/1999 | Chambers et al. | 370/281 |
| 5,875,430 A | 2/1999 | Koether | |
| 5,880,864 A | 3/1999 | Williams et al. | |
| 5,892,865 A | 4/1999 | Williams | |
| 5,969,836 A | 10/1999 | Foltzer | |
| 6,002,720 A | 12/1999 | Yurt et al. | |
| 6,041,056 A | 3/2000 | Bigham et al. | |
| 6,097,159 A | 8/2000 | Mogi et al. | |
| 6,097,515 A | 8/2000 | Pomp et al. | |
| 6,144,702 A | 11/2000 | Yurt et al. | |
| 6,151,343 A | 11/2000 | Jurgensen | |
| RE37,125 E | 4/2001 | Carlson et al. | |
| 6,295,148 B1 | 9/2001 | Atlas | |
| 6,336,201 B1 | 1/2002 | Geile et al. | |
| 6,356,369 B1 | 3/2002 | Farhan | |
| 6,360,320 B1 | 3/2002 | Ishiguro et al. | |
| 6,385,366 B1 | 5/2002 | Lin | |
| 6,427,035 B1 | 7/2002 | Mahony | |
| 6,460,182 B1 | 10/2002 | BuAbbud | |
| 6,483,635 B1 | 11/2002 | Wach | |
| 6,546,014 B1 | 4/2003 | Kramer et al. | |
| 6,674,967 B2 | 1/2004 | Skrobko et al. | |
| 6,687,432 B2 * | 2/2004 | Schemmann et al. | 385/24 |
| 7,007,297 B1 * | 2/2006 | Woodward | 725/129 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0030785 A1 | 10/2001 | Pangrac et al. | |
| 2002/0021465 A1 | 2/2002 | Moore, Jr. et al. | |
| 2002/0039218 A1 | 4/2002 | Farmer et al. | |
| 2002/0089725 A1 | 7/2002 | Farmer et al. | |
| 2002/0135843 A1 | 9/2002 | Gruia | |
| 2002/0164026 A1 | 11/2002 | Huima | |
| 2003/0090320 A1 | 5/2003 | Skrobko et al. | |

FOREIGN PATENT DOCUMENTS

| | | |
|---|---|---|
| EP | 0720322 A2 | 7/1996 |
| EP | 0 566 662 | 11/1999 |
| EP | 0955739 A2 | 11/1999 |
| EP | 0 933 892 | 10/2003 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |

OTHER PUBLICATIONS

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000, pp. 269-275.

J. Masip-Torné, et al., "Providing Differentiated Service Categories in Optical Packet Networks", Proceedings of the International Teletraffic Congress. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

Global Access™, Universal Services Gateway, USG100, ARRIS, pp. 1-2, Oct. 18, 2002.

Global Access™, Universal Access Switch, UAS4024, ARRIS, pp. 1-2, Aug. 28, 2002.

International Search Report dated Dec. 4, 2002 for PCT/US02/27398.

International Search Report dated Dec. 17, 2002 for PCT/US02/15861.

"Trading Update and Operational Review Presentation" Marconi, Sep. 4, 2001, pp. 1-35.

"Cable Market" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC—New FITL Configuration" 1 pg, Marconi Corporation, PLC, 2002 at www.Marconi.com.

"En-Touch" at 5 pgs, Marconi Corporation, PLC, 2002 www.Marconi.com.

"Fiber to the Home" International Engineering Consortium (no date) pp. 1-10, available at www.iec.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5pgs.

"Deep Fiber HFC: A Next-Generation Integrated Access Solution Offering Significant Improvement Over Traditional HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6pgs.

"Fiber Optics of New Development MDUs: A Research Summary," Marconi Corporation PLC, May 2000, 5pgs.

"Thermal Management Challenges: Small ONU Enclosures," Marconi Corporation PLC, May 2000, 9pgs.

"Passive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linnell, "A Wide-Band Local Access System Using Emerging-Technology Components," IEEE, Jul. 1986, pp. 612-618.

"Digital Broadband Delivery System: Out of Band Transport—Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Policing and Shaping Overview" *Quality of Service Solutions Configuration Guide*, Cisco Systems, Inc. (No Date).

"Cisco IOS™ Software Quality of Service Solutions," Cisco Systems, Inc. 1998, 28 pgs.

International Search Report for PCT/US01/21298, 2 pgs , mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineering Consortium, 2000 at www.iec.org.

Bourne, John et al., "Heathrow—Experience and Evolution" IEEE, 1990, pp. 1091-1095.

Miki, Tetsuya et al., "A Design Concept on Fiber-Optic Wavelength-Division-Multiplexing Subscriber Loop System" WTG—Fachber, 1980; pp. 41-45.

Yamaguchi, K. et al., "A Broadband Access Network Based on Optical Signal Processing: The Photonic Highway" IEEE, 1990, pp. 1030-1037.

International Search Report of Jul. 7, 2003 for PCT/US01/51350.

Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.

International Search Report of Jul. 2, 2003 for PCT/US03/07814.

International Search Report of Oct. 3, 2003 for PCT/US03/12231.

Ciciora, Walter S. et al., "Modern Cable Television Technology: Video, Voice, and Data Communications", © 1999, pp. 162-214, Chapter 4, Morgan Kaufmann Publishers, Inc., San Francisco, California.

Glaesemann, G. Scott et al., "The Mechanical Reliability of Corning® Optical Fiber in Bending White Paper", Sep. 2002, pp. 1-4.

Corning® SMF-28™ Optical Fiber Product Information, "Corning® Single-Mode Optical Fiber" Apr. 2002, pp. 1-4.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Single-Fiber Network Access Devices for Voice, Video and Data Services to the Home or Curb" Mar. 19, 2001, pp. 1-3.

Optical Networks Daily, a Publication of Optical Keyhole, Aug. 26, 2003, pp. 1-13.

McDevitt et al., Switched vs Broadcast Video for Fiber-to-the Home Systems, Alcatel Network Systems, 1990, IEEE, CH2829-0/90/0000-1109, pp. 1109-1119.

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

* cited by examiner

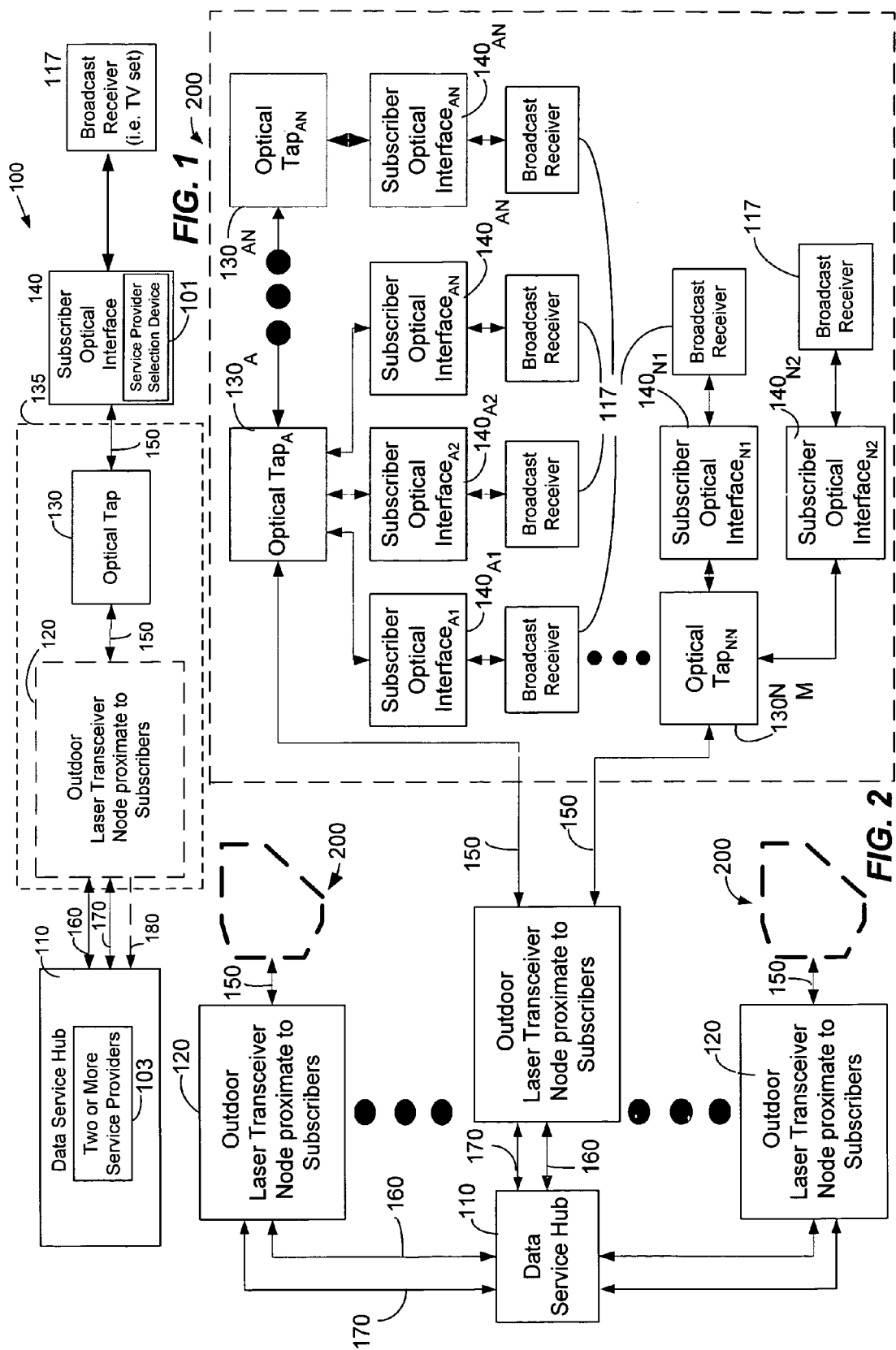

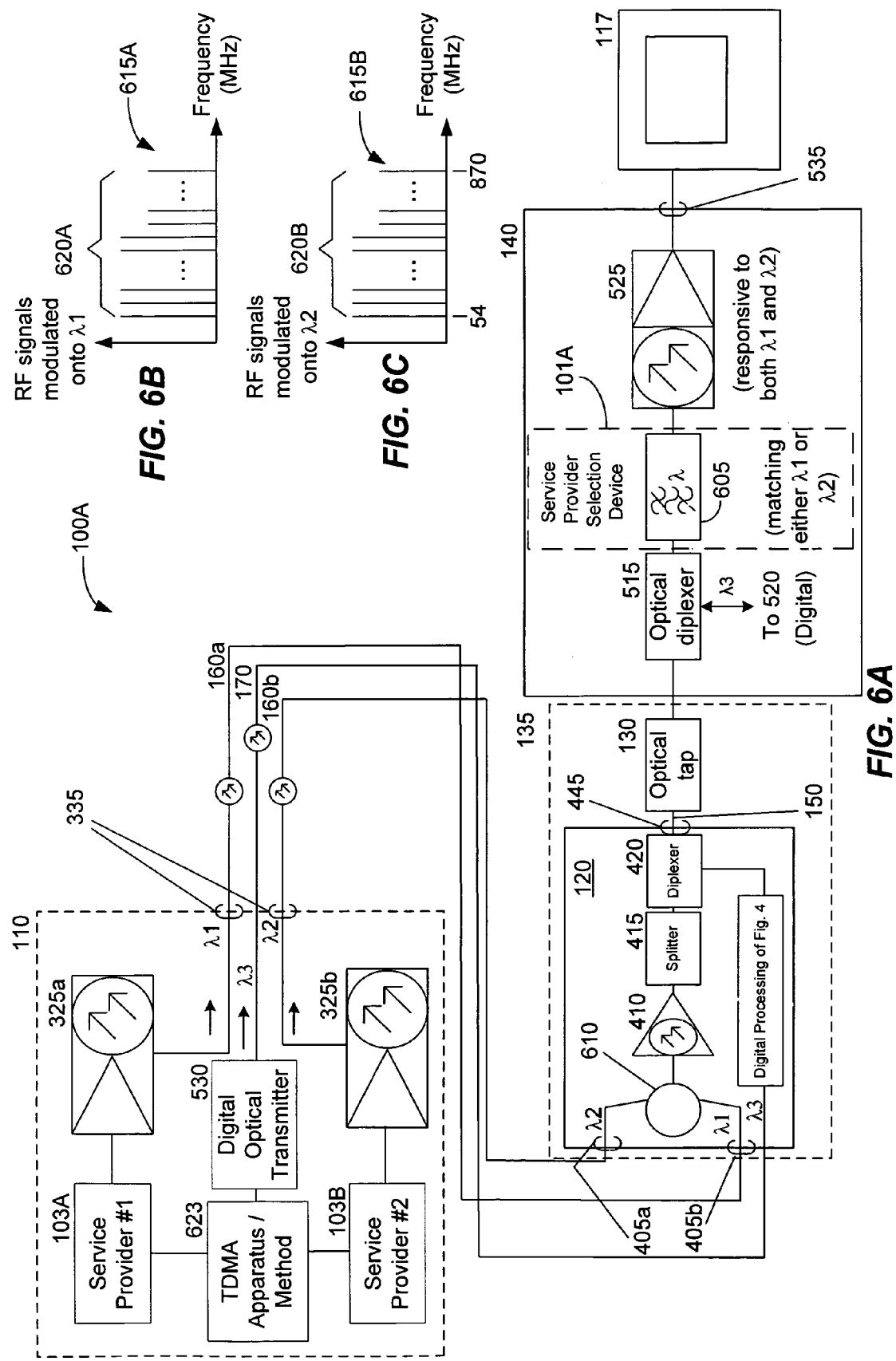

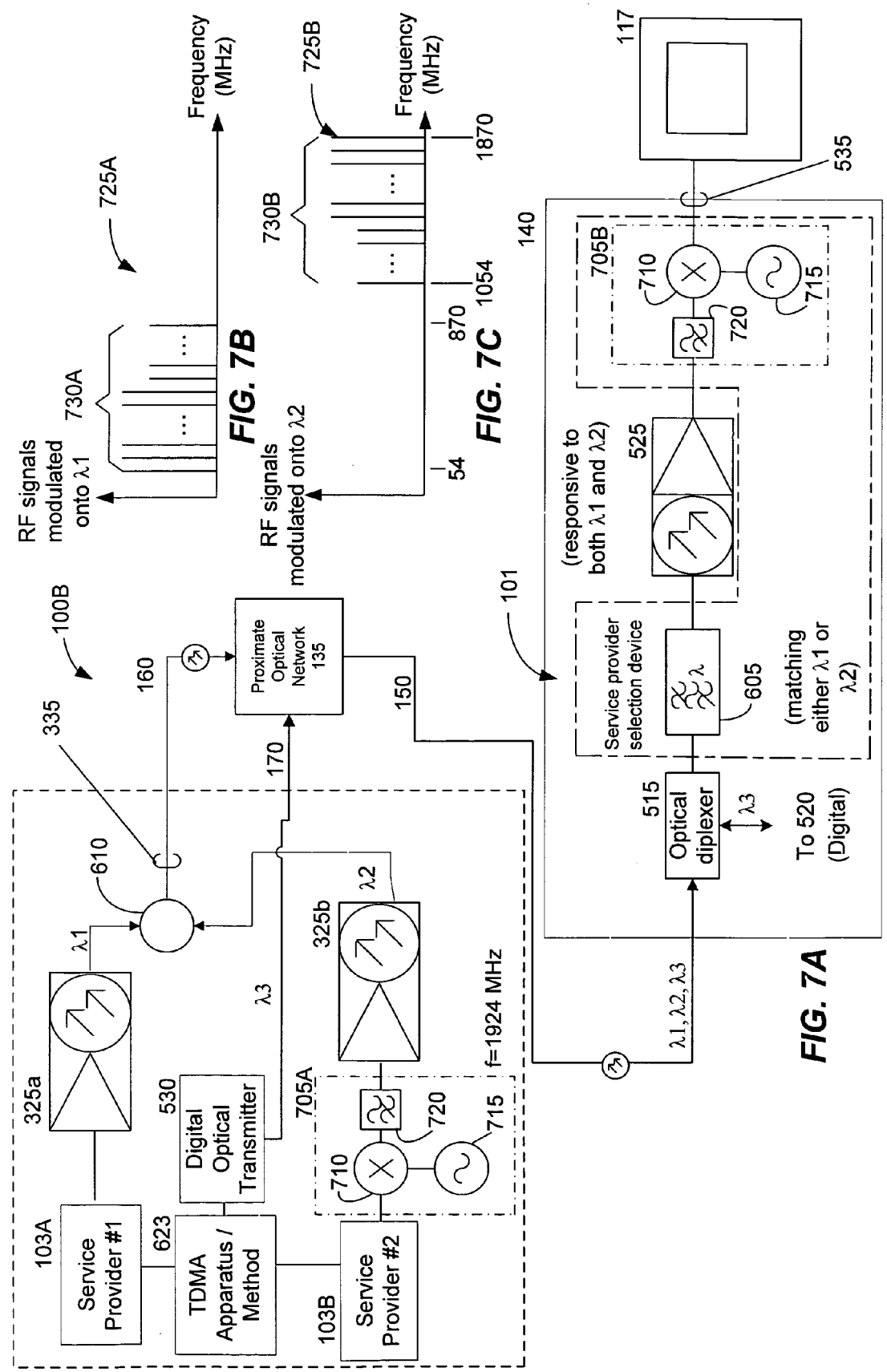

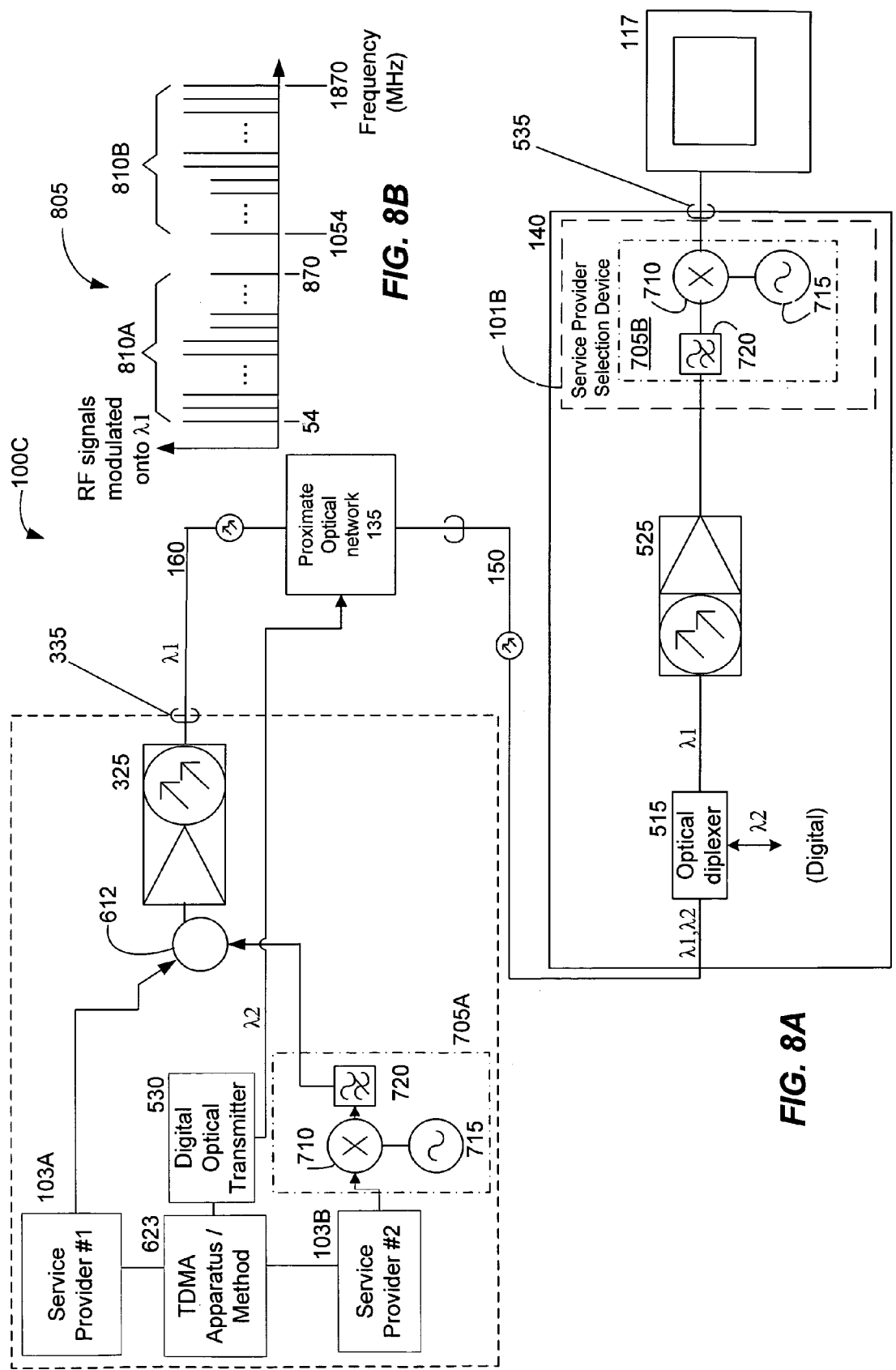

METHOD AND SYSTEM FOR SUPPORTING MULTIPLE SERVICE PROVIDERS WITHIN A SINGLE OPTICAL NETWORK

STATEMENT REGARDING RELATED APPLICATIONS

The present application is a continuation-in-part of non-provisional patent application entitled, "System and Method for Communicating Optical Signals Between A Data Service Provider and Subscribers," filed on Jul. 5, 2001, now U.S. Pat. No. 6,973,271 and assigned U.S. application Ser. No. 09/899,410; and the present application claims priority to provisional patent application entitled, "Method of Providing for Transmission of Multiple Service Providers' Broadcast Signals," filed on Oct. 30, 2002 and assigned U.S. application Ser. No. 60/422,154.

TECHNICAL FIELD

The present invention relates to video, voice, and data communications. More particularly, the present invention relates to a fiber-to-the-home (FTTH) system that is capable of supporting broadcast signals form multiple service providers over a single optical network.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

Meanwhile, one problem that data service providers face when changing from coaxial cables to optical fibers is the expense of building their own optical network. Similar to traditional coaxial cable networks, in order for a service provider to compete with another service provider, it has been typical business practice for the service provider to build its own network relative to the network of the competing service provider.

Instead of the service providers building their own separate optical networks, some municipalities have proposed constructing optical networks for their residents in which service providers could share the newly constructed optical networks. One proposed conventional way for service providers to share a municipal optical network is by using digital signals such as internet protocol (IP) packets to support data as well as voice and video services.

For video services, transmitting video information in IP packets would require digital optical transmitters to modulate a digital optical carrier. Digital optical receivers would be needed to demodulate the digital optical carrier. And digital electrical receivers such as digital set top terminals (STTs) or boxes would be required to decipher the video services contained in the IP packets. Such set top boxes are expensive and make implementing an all digital optical network very cost prohibitive for both the municipality and the service providers.

To eliminate the need of set top boxes to support digital video services, service providers could modulate analog optical carriers of different wavelengths with analog electrical Radio Frequency (RF) signals. Once the analog optical carriers are converted to the electrical domain at the subscriber location, a television (TV) set could easily process the video information from the electrical video signals without the need of a set top box. However, at least one problem exists when multiple service providers attempt to share an optical network using analog optical signals propagating at different wavelengths: Stimulated Raman Scattering (SRS).

SRS can cause mutual interference between two broadcast signals occupying the same RF channel on different optical wavelengths on the same optical waveguide. SRS is typically made worse by longer optical waveguides and, effectively, by larger splitting ratios. SRS can create crosstalk between the two signals on different wavelengths. For analog TV applications, crosstalk manifests itself as a ghost image of the other signal in the best case, and as a beat (moving lines in the picture) in the worst and most common case.

Accordingly, there is a need in the art for a system and method for communicating optical signals between a data service provider and a subscriber that can eliminate the effects of SRS when multiple data service providers are sharing a single optical network using optical carriers of different wavelengths. Another need exists in the art for supporting analog optical carriers of different wavelengths for large distances in an optical network in which numerous optical carriers can be split several times. Another further need exists in the art for a method and system that can support both analog and digital optical carriers in order to provide video as well as data services such as internet connections and telephone services.

SUMMARY OF THE INVENTION

The present invention is generally drawn to a system and method for supporting signals from multiple service providers that can be propagated over a single optical network. More specifically, the present invention can include a method and system for supporting electrical broadcast signals from multiple service providers by using analog optical carriers. Unlike digital optical carriers that typically support data signals such as IP packets, analog optical carriers that can be demodulated or translated back into the electrical broadcast signals do not require additional and costly hardware for reception by a broadcast receiving device such as a television (TV) set. In other words, with the present invention, a TV set does not require significant digital hardware such as a digital set top box to allow the TV set to display broadcast signals from a desired service provider who is one of several service providers that may propagate broadcast signals over a single optical network.

Broadcast signals can include, but are not limited, analog electrical radio-frequency (RF) signals as well as digital electrical broadcast signals that are modulated on to RF carriers. The digital electrical broadcast signals can comprise high definition television (HDTV) signals and other like signals. The analog electrical radio-frequency signals can comprise television signals as well as radio signals.

The present invention can allow a plurality of competing service providers to offer data and video services to a subscriber over a single optical network. In this way, separate and competing service providers can use the same optical network in order to offer their services to subscribers. When a subscriber desires to change from a first service provider to a second service provider, the amount of hardware needed to complete this change in service can be minimized compared to that of conventional, separate optical networks that may support competing service providers.

The method and system of the present invention can also reduce and even substantially eliminate the effects of Stimulated Raman Scattering (SRS) when service providers use analog optical carriers at different wavelengths on the same optical waveguide. The present invention can reduce and even substantially eliminate the effects of SRS with a variety of methods and components that can make up the inventive system.

For data services that are supported by a single digital optical carrier having a wavelength different from the analog optical carriers discussed above, the service providers can use time division multiplexing methods for sharing the single digital optical carrier. Two methods in combination with time division multiplexing methods that can be used to provide for multiple data service providers on a single optical carrier within a single optical network can include multinetting and source-based routing. These are understood by those skilled in the art. In multinetting, each subscriber optical interface located adjacent or within a subscriber's home may be assigned to a different multinet, along with the appropriate service provider's router at the data service hub. In source-based routing, each subscriber data device attached to a subscriber optical interface can be assigned an IP address corresponding to the appropriate service provider Summary of First Exemplary Aspect According to one exemplary aspect, a system and method can include a data service hub that has two separate service providers generating separate electrical broadcast signals. The electrical broadcast signals can modulate analog optical carriers operating at different wavelengths relative to each other. Each analog optical carrier can be propagated on its own separate optical waveguide when exiting the data service hub. At a threshold distance (or less than the threshold distance) and at a node that is spaced from the data service hub, the two analog optical carriers can be combined and propagated along a single optical waveguide. The node according to this exemplary aspect may or may not have hardware or software (or both) for supporting digital electrical data signals modulated on an optical carrier in addition to the electrical broadcast signals modulated on the analog optical carriers. In other words, the node according to one exemplary aspect may be simple in structure such as including only optical combiners and other like simple optical architectures. The analog optical signals propagating through the single optical waveguide can be divided as desired for communicating with different subscribers.

A subscriber optical interface coupled to the single optical waveguide and attached to the dwelling of the subscriber can include a service provider selection device that can select one of the analog optical carriers. According to this exemplary aspect, the service provider selection device can comprise an optical filter that passes analog optical carriers of a first wavelength and rejects analog optical carriers of a second wavelength or vice versa.

Summary of Second Exemplary Aspect

According to a second exemplary aspect, a system and method can include a data service hub that has two separate service providers generating separate electrical broadcast signals. One of the service providers can use block conversion to generate its electrical broadcast signals. The electrical broadcast signals can modulate analog optical carriers operating at different wavelengths relative to each other. The analog optical carriers can be combined before exiting the data service hub and can be propagated along a single optical waveguide upon exiting the data service hub. The analog optical signals propagating through the single optical waveguide can be divided as desired for communicating with different subscribers.

A subscriber optical interface coupled to the single optical waveguide and attached to the dwelling of the subscriber can include a service provider selection device that can select one of the analog optical carriers. According to this exemplary aspect, the service provider selection device can comprise a block converter and an optical filter that passes analog optical carriers of a first wavelength and rejects analog optical carriers of a second wavelength or vice versa.

Summary of Third Exemplary Aspect

According to a third exemplary aspect, a system and method can include a data service hub that has two separate service providers generating separate electrical broadcast signals. One of service providers can use block conversion to generate its electrical broadcast signals. The electrical broadcast signals can be first combined and then can be used to modulate a single analog optical carrier. The analog optical carrier can be propagated along a single optical waveguide upon exiting the data service hub. The analog optical signals propagating through the single optical waveguide can be divided as desired for communicating with different subscribers.

A subscriber optical interface coupled to the single optical waveguide and attached to the dwelling of the subscriber can include a service provider selection device that can select one of the analog optical carriers. According to this exemplary aspect, the service provider selection device can comprise a block converter and an optical filter that passes analog optical carriers of a first wavelength and rejects analog optical carriers of a second wavelength or vice versa.

Summary of Fourth Exemplary Aspect

According to a fourth exemplary aspect, a system and method can include a data service hub that has two separate service providers generating separate analog electrical broadcast signals. The two service providers can also each generate separate digital electrical broadcast signals. The analog electrical broadcast signals of a first service provider an be generated with a higher amplitude within a lower portion of a frequency spectrum. The digital electrical broadcast signals of the first service provider can be generated with a lower amplitude relative to the analog electrical broadcast signals and within an upper portion of the frequency spectrum.

Meanwhile, the analog electrical broadcast signals of a second service provider can be generated with a higher amplitude and within the upper portion of the frequency spectrum, which is opposite to the digital electrical broadcast signals of the first service provider. The digital electrical broadcast signals of the second service provider can be generated with a lower amplitude relative to the analog electrical broadcast signals within a lower portion of the frequency spectrum, which is opposite to the digital signals of the first service provider.

The digital and analog electrical broadcast signals of each provider can modulate an analog optical carrier operating at a different wavelength relative to other analog optical carriers. The different analog optical carriers can be combined before exiting the data service hub and can be propagated along a single optical waveguide upon exiting the data service hub.

A subscriber optical interface coupled to the single optical waveguide and attached to the dwelling of the subscriber can include a service provider selection device that can select one of the analog optical carriers. According to this exemplary aspect, the service provider selection device can comprise an optical filter that passes analog optical carriers of a first wavelength and rejects analog optical carriers of a second wavelength or vice versa.

Summary of Fifth and Sixth Exemplary Aspects

According to a fifth and sixth exemplary aspect, a system and method can include a data service hub that has two separate service providers generating separate analog electrical broadcast signals. According to the fifth aspect, both service providers can use a phase lock system to generate their analog electrical broadcast signals. According to the sixth aspect, both service providers can use a carrier offset system to generate their analog electrical broadcast signals.

For both aspects, the analog electrical broadcast signals can modulate analog optical carriers operating at different wavelengths relative to each other. The analog optical carriers can be combined before exiting the data service hub and can be propagated along a single optical waveguide upon exiting the data service hub. The analog optical signals propagating through the single optical waveguide can be divided as desired for communicating with different subscribers.

A subscriber optical interface coupled to the single optical waveguide and attached to the dwelling of the subscriber can include a service provider selection device that can select one of the analog optical carriers. According to this exemplary aspect, the service provider selection device can comprise an optical filter that passes analog optical carriers of a first wavelength and rejects analog optical carriers of a second wavelength or vice versa.

Summary of Seventh Exemplary aspect

According to a seventh exemplary aspect, a plurality of service providers can be interconnected in an optical ring architecture where single optical waveguides can support the optical signals of the plurality of service providers. The optical ring can comprise optical waveguides supporting optical signals using one or more of the techniques discussed above with respect to the first through sixth exemplary aspects.

Summary of Data Services for each exemplary aspect

In combination with each exemplary aspect discussed above, the service providers can use time division multiplexing methods for sharing a digital optical carrier for upstream and downstream data communications. Two methods in combination with time division multiplexing that can be used to provide for multiple digital data service providers on a single optical network include multinetting and source-based routing. These are understood by those skilled in the art. It is also recognized that the service providers generating the electrical broadcast signals could be different from the service providers generating the electrical digital signals for data. In other words, a first service provider could provide broadcast services to a subscriber while a second service provider could provide data services and a third service provider could provide voice services.

BRIEF DESCRIPTION OF THE DRAWINGS

FIG. 1 is a functional block diagram of some core components of an exemplary optical network architecture according to an exemplary embodiment of the present convention that can support multiple service providers.

FIG. 2 is a functional block diagram illustrating additional aspects of an exemplary optical network architecture according to an exemplary embodiment of the present invention.

FIG. 6A is a functional block diagram illustrating an optical network architecture in which analog optical carriers of respective service providers are propagated along separate optical waveguides deep into the network where the analog optical carriers are then combined according to a first exemplary embodiment of the present invention.

FIG. 6B is a graph illustrating an exemplary frequency spectrum of a first wavelength for a first analog optical carrier of a first service provider who may use the exemplary multiple service provider optical architecture illustrated in FIG. 6A.

FIG. 6C is a graph illustrating an exemplary frequency spectrum of a second wavelength of a second analog optical carrier for a second service provider who may use the exemplary multiple service provider optical architecture illustrated in FIG. 6A.

FIG. 7A is a functional block diagram illustrating an optical network architecture in which electrical broadcast signals are generated with block conversion and then modulated onto analog optical carriers which are combined at the data service hub so that the analog optical carriers are propagated along a single optical waveguide according to a second exemplary embodiment of the present invention.

FIG. 7B is a graph illustrating an exemplary frequency spectrum of a first wavelength for a first analog optical carrier of a first service provider who may use the exemplary multiple service provider optical architecture illustrated in FIG. 7A.

FIG. 7C is a graph illustrating an exemplary frequency spectrum of a second wavelength of a second analog optical carrier for a second service provider who may use block conversion and the exemplary multiple service provider optical architecture illustrated in FIG. 7A.

FIG. 8A is a functional block diagram illustrating an optical network architecture in which electrical broadcast signals are generated with block conversion and combined and then modulated onto a single analog optical carrier which is propagated along a single optical waveguide according to a third exemplary embodiment of the present invention.

FIG. 8B is a graph illustrating an exemplary frequency spectrum of an analog optical carrier that supports signals of a first and second service provider through block conversion as illustrated in the exemplary multiple service provider optical architecture illustrated in FIG. 8A.

DETAILED DESCRIPTION OF EXEMPLARY EMBODIMENTS OF THE INVENTION

Figure 3:
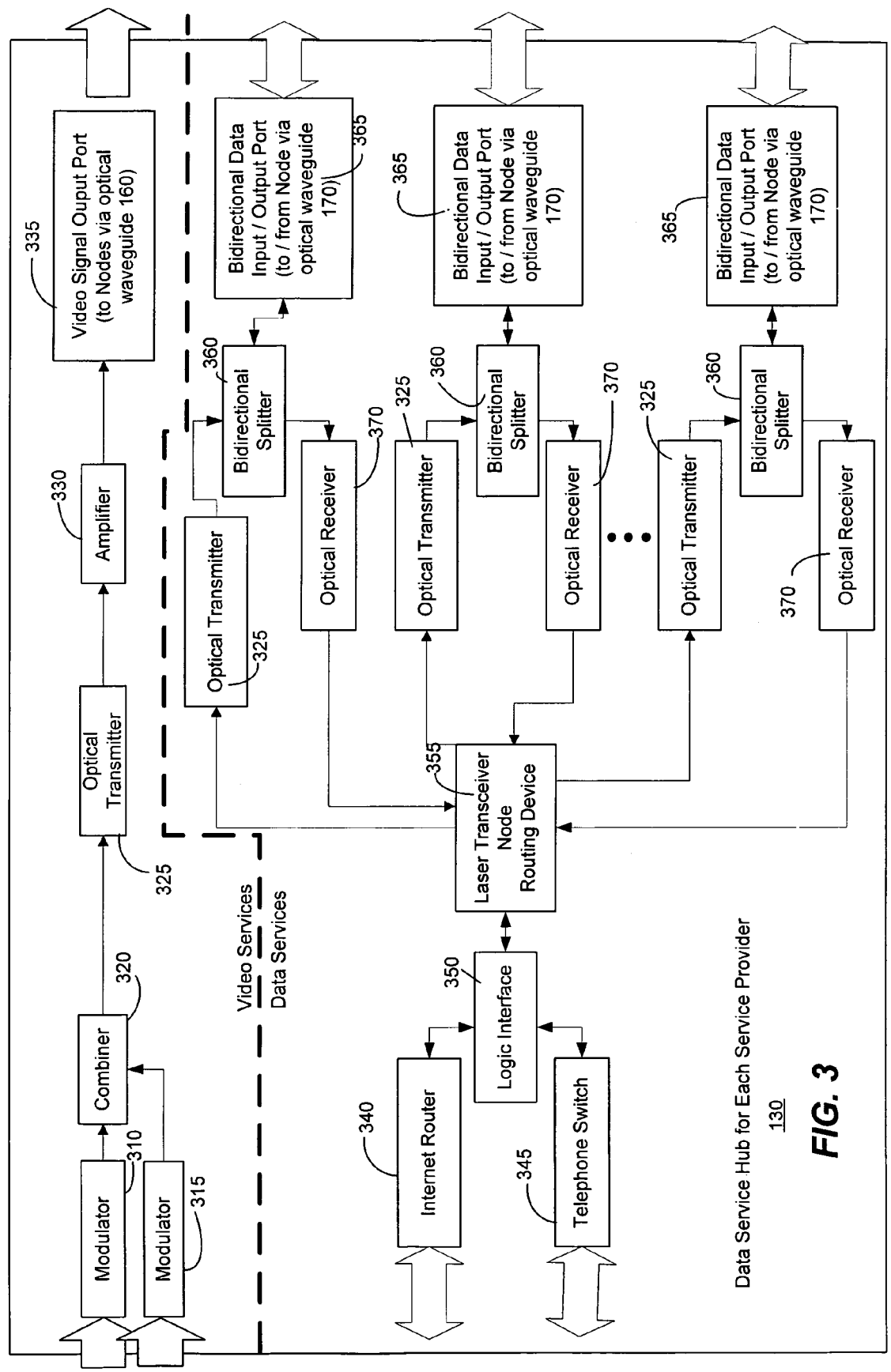
FIG. 3 is a functional block diagram illustrating an exemplary data service hub according to an exemplary embodiment of the present invention.

A method and system communicates analog video signals from multiple service providers to subscribers by using analog optical carriers. Unlike digital optical carriers that typically support digital video signals or data, analog optical carriers that can be demodulated or translated back into electrical broadcast signals do not require additional and costly hardware for reception by a broadcast receiving device such as a television (TV) set.

With the present invention, a TV set does not require significant digital hardware such as a digital set top box to allow the TV set to view video signals from a desired service provider. Video signals from several different service providers may be propagated over a single optical network in the form of analog optical signals that are modulated with electrical broadcast signals.

The present invention can allow a plurality of competing service providers to offer data and video services to a subscriber over a single optical network. In this way, separate and competing service providers can use the same optical network in order to offer their services to subscribers.

Exemplary Base Optical Architecture

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that houses two or more service providers 103. Each service provider 103 can comprise hardware or software (or both) that supplies any one of data and video services for subscribers. Further details of the data service hub 110 will be discussed in detail below with respect to FIG. 3.

The data service hub 110 is coupled to a plurality of outdoor laser transceiver nodes 120. The laser transceiver nodes 120, in turn, are each coupled to a plurality of optical taps 130. The optical taps 130 can be coupled to a plurality of subscriber optical interfaces 140. Coupled to each subscriber optical interface 140 can be a broadcast receiver 117 such as a television (TV) set.

Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100.

While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the multiple service provider system of the present invention, several subscriber optical interfaces 140 can be coupled to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole (underground vault)." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120. The RF system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIGS. 5, 6, and 7.

In one exemplary embodiment of the present invention, three trunk optical waveguides 160, 170, and 180 (that can comprise optical fibers) can propagate optical signals from the data service hub 110 to the outdoor laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast analog video and control signals. The analog signals can be carried in a traditional cable television format wherein the broadcast signals are modulated onto analog optical carriers with an optical transmitter (not shown in this Figure) in the data service hub 110. The first optical waveguide 160 can also carry upstream PF signals that are generated by respective video Broadcast receivers 117.

A second optical waveguide 170 can carry upstream and downstream targeted services such as data and telephone services to be delivered to or received from one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140.

The present invention is not limited to 4-way and 8-way optical splitters. Other optical taps having fewer or more than 4-way or 8-way splits are rot beyond the scope of the present invention. The outdoor laser transceiver node 120, the optical tap 130, and the optical waveguide disposed between the laser transceiver node and the optical tap 130 can form and can be referred to as a proximate optical network 135 that is close to subscribers.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 coupled between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is coupled to the outdoor laser transceiver node 120. In one exemplary embodiment, six optical fibers 150 are designed to be coupled to the outdoor laser transceiver node 120. Through the use of the optical taps 130, sixteen subscribers can be assigned to each of the six optical fibers 150 that are coupled to the outdoor laser transceiver node 120.

In another exemplary embodiment, twelve optical fibers 150 can be coupled to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is coupled between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention for an individual service provider. If an optical network supports another individual service provider within the data service hub 110 as illustrated in FIG. 3, then all of the components illustrated in FIG. 3 would be replicated to support the other service provider. That is, each service provider would include its own modulators 310, 315, an internet router 340, a telephone switch 345, laser transceiver node routing device 355, and optical transmitters 325 and receivers 370.

For data services that will be modulated on a single digital optical carrier by time division multiplexed electrical digital data signals received from different service providers, the service providers can share much of the equipment illustrated in FIG. 3. That is, equipment between the laser transceiver node routing device 355 and the ports 365 and including the laser transceiver node routing device 355 can have inputs for each service provider (not shown in FIG. 3).

The exemplary data service hub 110 illustrated in FIG. 3 is also designed for a two trunk optical waveguide system. That is, this data service hub 110 of FIG. 3 is designed to send and receive optical signals to and from the outdoor laser transceiver node 120 along the first optical waveguide 160. With this exemplary embodiment, only the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a first combiner 320. The combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, some portion of the video signals may be generated and converted to optical form at a remote first data service hub 110. At a second data service hub 110, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VC-SELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a video signal input/output port 335 which is coupled to one or more first optical waveguides 160.

The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be coupled through any of several conventional methods of interconnection.

The data service hub 110 can further comprise a logic interface 350 that is coupled to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can also supply downstream data signals to respective optical transmitters 325. The data signals converted by the optical transmitters 325 can then be propagated to a bi-directional splitter 360. The optical signals sent from the optical transmitter 325 into the bidirectional splitter 360 can then be propagated towards a bi-directional data input/output port 365 that is coupled to a second optical waveguide 170 that supports bi-directional optical data signals between the data service hub 110 and a respective laser transceiver node 120.

Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

According to one exemplary embodiment, most of the data services are transported by a digital optical carrier having a wavelength of 1310 nm. Meanwhile, the broadcast services are transported by analog optical carriers in the 1550 nm wavelength region. An optical diplexer 515 (discussed below and illustrated in FIG. 5) will separate the digital optical carrier from the one or more analog optical carriers according to the carriers respective wavelength.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
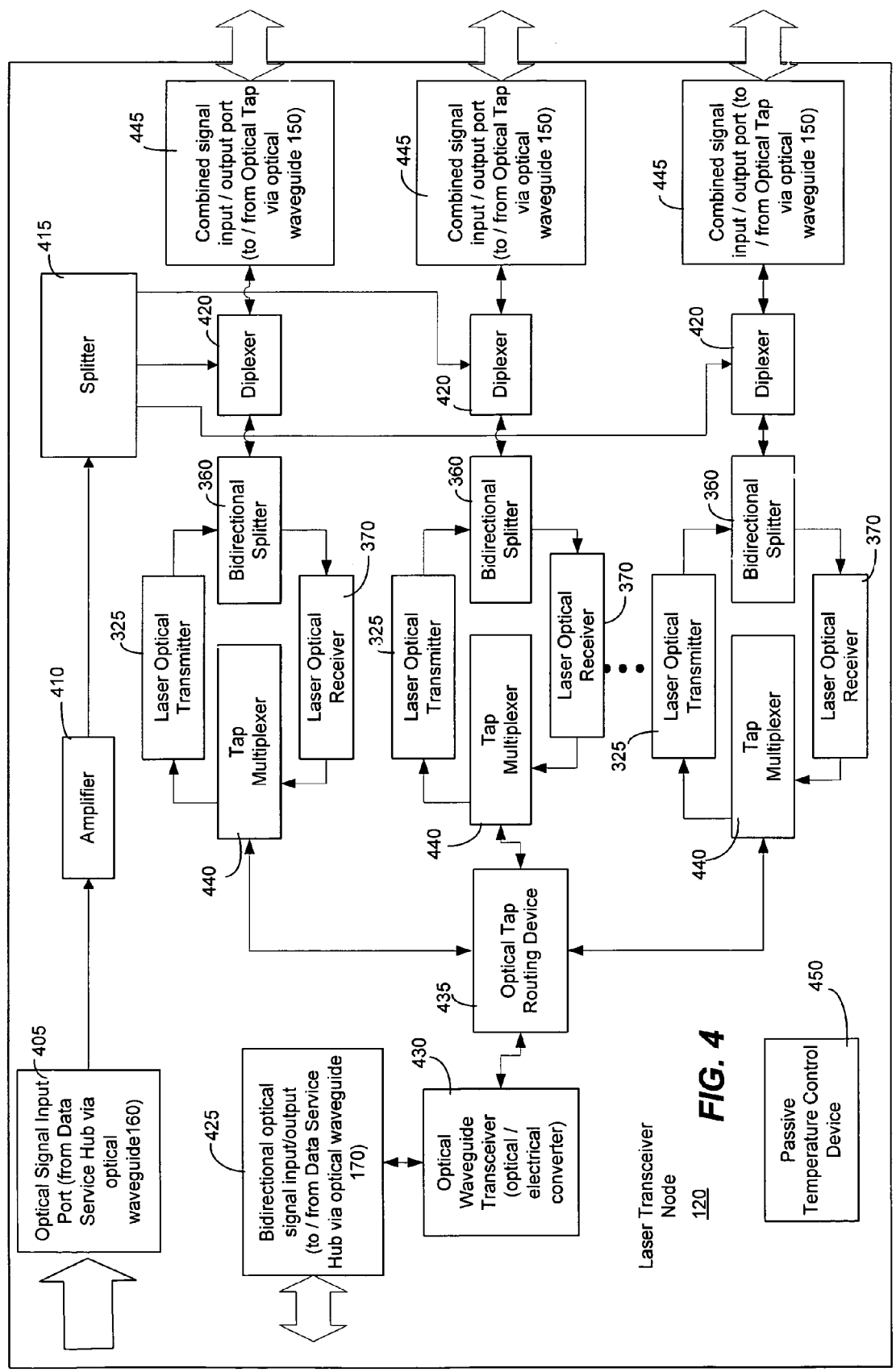
FIG. 4 is a functional block diagram illustrating an exemplary laser transceiver node according to an exemplary embodiment of the present invention.

Referring now to FIG. 4, this Figure illustrates a functional block diagram of an exemplary outdoor laser transceiver node 120 of the present invention. In this exemplary embodiment, the laser transceiver node 120 can comprise an optical signal input port 405 that can receive optical signals propagated from the data service hub 110 that are propagated along a first optical waveguide 160. The optical signals received at the optical signal input port 405 can comprise downstream broadcast video data.

It is noted that according to one or more exemplary embodiments, the outdoor laser transceiver node 120 may comprise an optical combiner 610 (not illustrated in FIG. 4 but illustrated in FIG. 6). The optical combiner can comprise a wavelength division multiplexer (WDM) and can be used to combine analog optical carriers of different wavelengths that are propagated along separate optical waveguides 160 to the laser transceiver node 160. Further details of such an exemplary embodiment will be discussed below with respect to FIG. 6.

The downstream broadcast video data can also comprise downstream video service control signals. The downstream broadcast video data is typically modulated on an analog optical carrier as will be discussed in further detail below with respect to FIGS. 6-11.

The downstream optical signals received at the input port 405 are propagated through an amplifier 410 such as an Erbium Doped Fiber Amplifier (EDFA) in which the optical signals are amplified. The amplified optical signals are then propagated to an optical splitter 415 that divides the downstream broadcast video optical signals (that may also include video service control signals if sent on modulated carriers) among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain.

The optical waveguide transceiver 430 further converts upstream electrical signals into the optical domain. The optical waveguide transceiver 430 can comprise an optical/electrical converter and an electrical/optical converter. Downstream and upstream electrical signals are communicated between the optical waveguide transceiver 430 and an optical tap routing device 435.

The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets as they arrive, by each tap multiplexer 440. The optical tap routing device is coupled to each tap multiplexer 440 to receive these upstream data and RF packets. The optical tap routing device 435 can relay upstream video control return packets and information packets that can comprise data and/or telephony packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or, tap multiplexer 440) is coupled to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which tap multiplexer 440 propagated an upstream optical signal (that is received as an electrical signal). The optical tap routing device 435 can format data and implement the protocol required to send and receive data from each individual subscriber coupled to a respective optical tap 130. The optical tap routing device 435 can comprise a computer or a hardwired apparatus that executes a program defining a protocol for communications with groups of subscribers assigned to individual ports. Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The single ports of the optical tap routing device 435 are coupled to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 525 and laser optical receiver 370. Each tap multiplexer 440 is coupled to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are coupled to a respective bi-directional splitter 360. Each bi-directional splitter 360 in turn is coupled to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is coupled to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
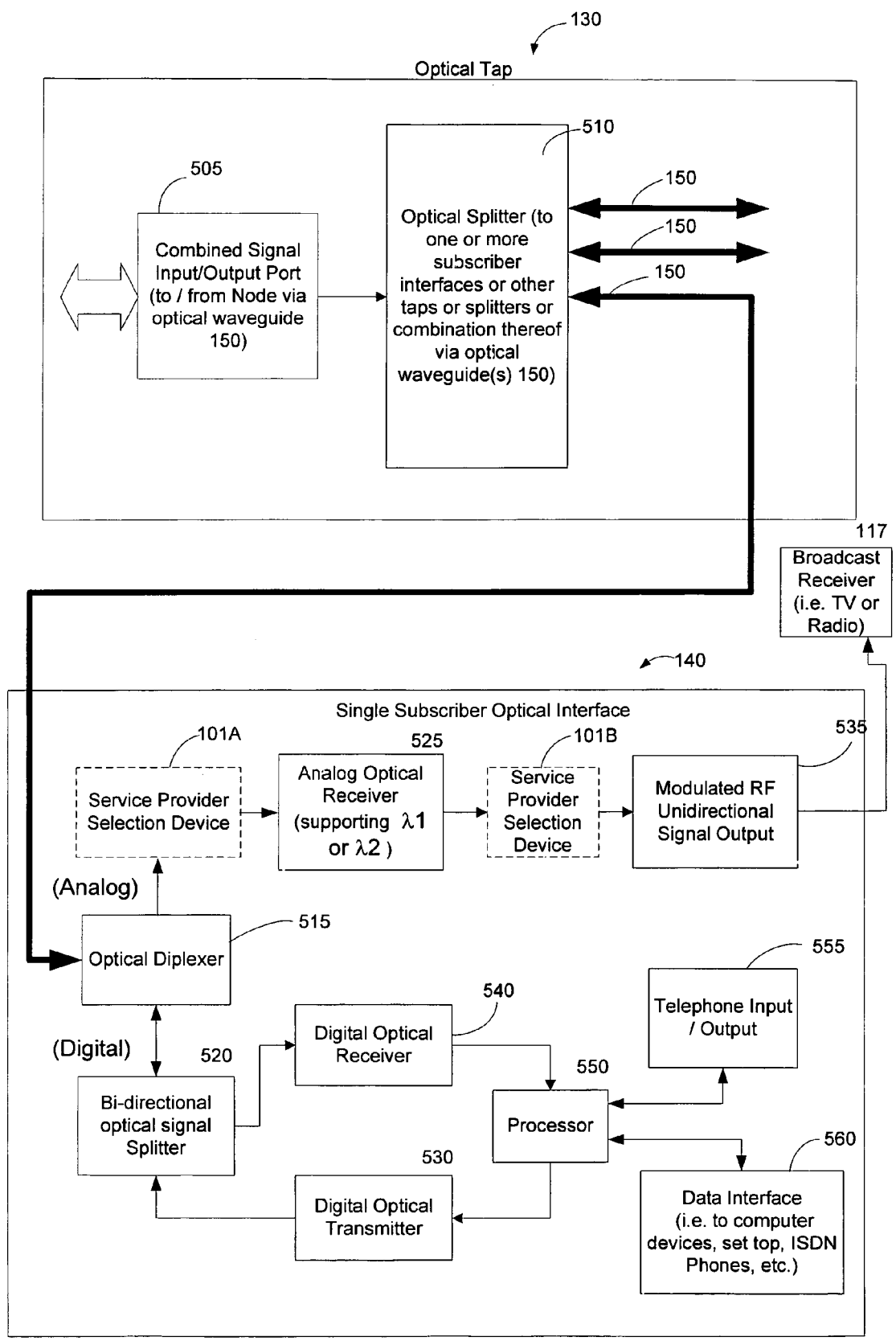
FIG. 5 is a functional block diagram illustrating an optical tap coupled to a subscriber optical interface according to an exemplary embodiment of the present invention.

Referring now to FIG. 5, this Figure is a functional block diagram illustrating an optical tap 130 coupled to a subscriber optical interface 140 by a single optical waveguide 150 according to one exemplary embodiment of the present invention. The optical tap 130 can comprise a combined signal input/output port 505 that is coupled to another distribution optical waveguide that is coupled to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention.

The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be coupled in a star architecture from the laser transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bi-directional optical signal splitter 520 and an analog optical receiver 525.

The optical diplexer 515 can separate or divide downstream optical signals based on wavelength. Typically, digital optical carriers will be propagated at a first wavelength while analog optical carriers will be propagated at second and third wavelengths different from the first wavelength. According to one exemplary embodiment, each service provider will modulate its analog optical carrier that typically supports video services at a unique wavelength relative to another service provider's analog optical carrier and relative to the digital optical carrier.

For services that can be supported by digital optical carriers, each service may share time on the same digital optical carrier (one for each direction) using time domain multiplexing methods well-known to those skilled in the art. In other words, the multiple service providers can use time division multiplexing methods for sharing a digital optical carrier for upstream and downstream data communications. Two methods in combination with time division multiplexing that can be used to provide for multiple data service providers on a single optical network include multinetting and source-based routing. These are understood by those skilled in the art. Services that can be supported by digital optical carriers include, but are not limited to, data, voice, as well as IP video. To identify which service provider is the originator of a digital signal that can comprise an IP packet, conventional routing techniques can be employed by the processor 550 (discussed below) where IP packet headers are used to identify the service provider associated with a particular IP packet.

It is recognized that the service providers generating the electrical broadcast signals could be different from the service providers generating the electrical digital signals for data. In other words, a first service provider could provide broadcast services to a subscriber while a second service provider could provide data services and third service provider could provide voice services to the same subscriber.

In such an exemplary embodiment where a subscriber has a single broadcast provider and multiple data service providers, the diplexer 515 would separate one of more analog optical carriers of broadcast service providers from the single digital optical carrier used by one or more data service providers. The service provider selection device 101 could then choose the broadcast service provider chosen by the subscriber while the processor 550 in combination with any telephone and or data interface 560 could select the desired data provider.

The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

A service provider selection device 101A can be attached to the optical diplexer 515 and positioned between the optical diplexer 515 and analog optical receiver 525 for processing the analog optical signals. In some exemplary embodiments, the service provider selection device 101B can be attached to the output of the analog optical receiver 525. And in some exemplary embodiments, the service provider selection device 101 can comprise two components where one component 101A is positioned between the optical diplexer 515 and the analog optical receiver 525 and where another component 101B is positioned between the analog optical receiver 525 and the modulated RF unidirectional signal output. The service provider selection device 101 has been illustrated with dashed lines to indicate that its location relative to the optical diplexer 515 and the analog optical receiver can vary depending upon the components that form this device.

According to one exemplary embodiment, the service provider selection device 101 can comprise an optical band pass filter that can be designed to pass wavelengths of a first magnitude while rejecting wavelengths of a second magnitude. As noted above, each service provider can modulate its own analog optical carriers at a unique wavelength to support video services. And the service provider selection device 101 can be used to chose a desired service provider to support the video for a particular subscriber. Further details of this embodiment of the service provider selection device 101 will be discussed below with respect to FIGS. 6A, 9A, 10, and 11.

According to another exemplary embodiment, the service provider selection device 101 can comprise a block converter. As will be discussed below, a service provider can set apart its analog electrical signals relative the analog electrical signals of another service provider by using block conversion. Further details of this embodiment of the service provider selection device 101 will be discussed below with respect to FIGS. 8A.

And according to another exemplary embodiment, the service provider selection device 101 can comprise an optical band pass filter in combination with a block converter. Further details of this exemplary embodiment of the service provider selection device 101 will be discussed below with respect to FIG. 7A.

The analog optical receiver 525 can convert the downstream, analog broadcast optical video signals into modulated RF television signals that are propagated out of the modulated RF unidirectional signal output 535. The modulated RF unidirectional signal output 535 can feed Broadcast receivers 117 such as video service terminals such as television sets or radios. The analog optical receiver 525 could process analog modulated RF transmission as well as digitally modulated RF transmissions for digital TV applications. However, in preferred and exemplary embodiments of the present invention, the analog optical receiver will process only analog modulated RF transmissions.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering the splitter 520 from the digital optical transmitter 530 are sent to optical diplexer 515 and then to optical tap 130. The bi-directional optical signal splitter 520 is coupled to a digital optical receiver 540 that converts downstream data optical signals into the electrical domain. Meanwhile the bi-directional optical signal splitter 520 is also coupled to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are coupled to a processor 550 that selects data intended for the instant subscriber optical interface 140 based upon an embedded address. The data handled by the processor 550 can comprise one or more of telephony and data services such as an Internet service. The processor 550 is coupled to a telephone input/output 555 that can comprise an analog interface.

The processor 550 is also coupled to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10BaseT, 100BaseT, Gigabit) interface, HPNA interface, a universal serial bus (IJSB) an IEEE1394 interface, an ADSL interface, and other like interfaces.

First Exemplary Multiple Service Provider Optical Architecture derived from Base Architecture 100

Referring now to FIG. 6A, this figure is a functional block diagram illustrating a multiple service provider optical network architecture 100A in which analog optical carriers of respective service providers 103A, 103B are propagated along separate optical waveguides 160a, 160b deep into the proximate optical network 135 where the analog optical carriers are then combined according to a first exemplary embodiment of the present invention.

In this exemplary embodiment, each service provider 103A, 103B can produce digital electrical data signals as well as electrical broadcast signals. The digital electrical data signals can be combined with a time division multiplexed method or apparatus (or both) 623. The output from the time division multiplexed method or apparatus (or both) 623 can then modulate a digital optical transmitter 530 to provide a single digital optical carrier.

Two methods in combination with time division multiplexing methods that can be used to provide for multiple data service providers 103A, 103B on a single optical network 100A can include multinetting and source-based routing. These are understood by those skilled in the art. In multinetting, each subscriber optical interface 140 located adjacent or within a subscriber's home may be assigned to a different multinet, along with the appropriate service provider's router at the data service hub. In source-based routing, each subscriber data device 140 attached to a subscriber optical interface can be assigned an IP address corresponding to the appropriate service provider 103.

As noted above, separate and additional service providers (not shown) can also generate the digital electrical data signals instead of the service providers 103 that are shown and that also generate the electrical broadcast signals. In other words, a data service hub 110 could be shared by first and second broadcast service providers 103A, 103B as well as third and fourth digital electrical data service providers (not illustrated). The digital electrical data signals can support data services that can include, but are not limited to, network services such as internet services, telephone services, digital IP video services, and other like services supported by digital electrical signals.

The digital optical carrier produced by the digital optical transmitter is propagated over an optical waveguide 170 to the laser transceiver node 120 that is separate from the optical waveguide 160 discussed below that propagates one or more analog optical carriers. The digital optical carrier typically has a wavelength that is different than the one or more analog optical carriers, as discussed below.

Meanwhile, the electrical broadcast signals can modulate analog optical transmitters 325a, 325b. The electrical broadcast signals can include, but are not limited, analog electrical radio-frequency (RF) signals as well as digital electrical broadcast signals that are modulated on to RF carriers. The digital electrical broadcast signals can comprise high definition television (HDTV) signals and other like signals. The analog electrical radio-frequency signals can comprise television signals as well as radio signals. The electrical broadcast signals can include signals that can be received and viewed with TV set or received and heard with a radio.

The analog optical carriers or signals produced by the optical transmitters 325a, 325b are propagated out of the data service hub 110 through the unidirectional signal output ports 335a, 335b along separate optical waveguides 160a, 160b. The analog optical carrier corresponding to the first service provider 103A has a first wavelength while the analog optical carrier corresponding to the second service provider 103B has a second wavelength that is different from the first wavelength.

At a predetermined threshold distance from the data service hub 110 and in a predetermined component of the optical architecture 100, all of the analog optical carriers can be combined. In this exemplary embodiment, the analog optical carriers of the first and second service providers 103A, 103B having different wavelengths are combined in a portion of the laser transceiver node 120 with an optical combiner or a wavelength division multiplexer (WDM) 610.

After all the analog optical carriers are combined with the optical combiner 610 but prior to the diplexer 420, they can be amplified with an optical amplifier 410. The digital optical carrier is also combined or mixed with the one or more analog optical carriers at the diplexer 420, as discussed above with respect to FIG. 4. The rectangular box in FIG. 6A labeled "Digital Processing of FIG. 4," indicates that all or some of the processing stages from FIG. 4 can be present in the laser transceiver node 120 of FIG. 6A. In one exemplary embodiment, the diplexer 420 can be located in a laser transceiver node 120 that is part of the proximate optical network 135. However, it is not beyond the scope and spirit of the present invention to position the diplexer 420 in another housing other than the laser transceiver node 120.

While details of the laser transceiver node 120 have been described above with respect to FIG. 4, according to alternate exemplary embodiments, the laser transceiver node 120 may or may not have hardware or software (or both) for supporting digital electrical data signals modulated on an optical carrier. In other words, the laser transceiver node 120 according to one exemplary embodiment may be simple in structure such as including only optical combiners 610 and optical diplexers 420 and other like simple optical architectures without the detailed electronics illustrated in FIG. 4. In such an exemplary embodiment, this junction outside of the data service hub 110 can be referred to as a node.

Mixing or combining the optical carriers at the laser transceiver node 120 is one preferred and exemplary embodiment of the present invention. Mixing the optical carriers at the laser transceiver node 120 is preferred because the length of any optical waveguide 150 after the two analog optical carriers are combined in the WDM 610 is limited. In one preferred and exemplary embodiment, the number of times the combined analog carriers can split is limited to eight, with a distance limit of three kilometers. In another preferred embodiment, the number of times the combined analog optical carriers can be split is limited to four, with a distance limit of ten kilometers.

Both of these preferred and suggested distances place a beat due to SRS well above the "good engineering practice" threshold of FIG. 6D, as will be discussed below. Splitting the combined analog optical carriers twelve ways can precede an eight or four-way split of a splitter 510, but in such scenarios, the optical waveguide distance between the optical amplifier 410 and the splitter 510 is only a few inches, so there is no possibility of significant SRS distortion being introduced.

After amplification, the combined analog optical carriers could be divided with the splitter 510 and transmitted along different optical waveguides 150. Relative to the laser transceiver node 120, the combined optical carriers could be divided again with the optical tap 130.

From the optical tap 130, the optical carriers could be propagated to individual subscriber optical interfaces 140. At each subscriber optical interface, the optical diplexer 515 can separate the digital optical carrier from the two or more analog optical carriers. The digital optical carrier can be sent to the bi-directional optical splitter 520 as discussed in further detail above with respect to FIG. 5.

Meanwhile, the diplexer 515 can forward the analog optical carriers to the service provider selection device 101A. For this exemplary embodiment illustrated in FIG. 6A, the service provider selection device 101A can comprise an optical bandpass filter 605 that matches one wavelength of a desired service provider's analog optical carrier. The optical bandpass filter 605 can reject the wavelengths of service providers' analog optical carriers that are not desired for processing.

After "selection" of the analog optical carrier of the desired service provider with the service provider selection device 101A, the analog optical receiver 525 can convert the selected analog optical carrier into the electrical domain. The electrical broadcast signals based on the analog optical carrier can then be processed with a broadcast receiver 117 such as a TV set or radio.

Referring now to FIGS. 6B and 6C, these figures are graphs 615A, 615B illustrating the exemplary frequency spectrum 620A of the first wavelength for a first analog optical carrier of a first service provider 103A and the exemplary frequency spectrum 620B of the second wavelength for a second analog optical carrier of a second service provider 103B. The frequency spectrums 620A, 620B of FIGS. 6B and 6C are identical, which means that the first service provider 103A and second service provider 103B could be offering identical video services (i.e. channels) but at different wavelengths.

Figure 6D:
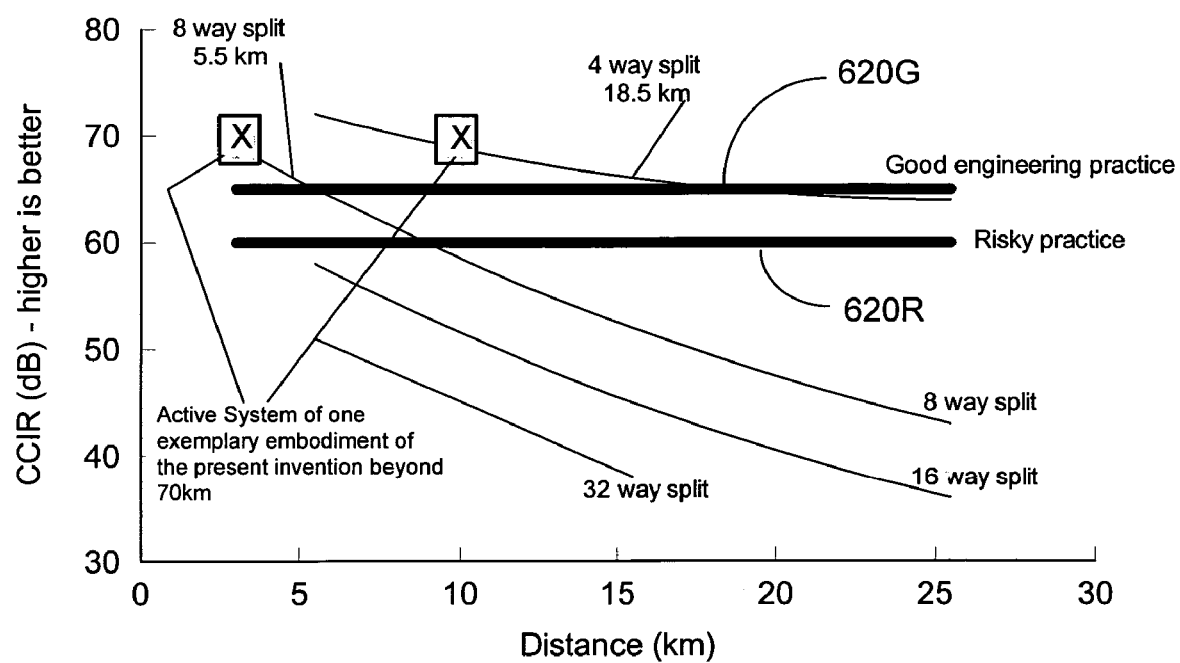
FIG. 6D a graph illustrating SRS-induced Carrier to Crosstalk Interference Ratio (CCIR) versus distance along an optical waveguide according to an exemplary embodiment of the present invention.

Referring now to FIG. 6D, this figure is a graph illustrating SRS-induced Carrier to Crosstalk Interference Ratio (CCIR) versus distance along an optical waveguide. The two thick horizontal lines 620G and 620R comprise limits or thresholds where acceptable engineering performance is above each line. Good engineering practice dictates that optical network architecture 100 be designed to keep CCIR greater than 65 dB (below the desired signal) which corresponds to the first line 620G. However, since some service providers are often tempted to push performance close to the threshold of visibility, a risky practice, the risky limit corresponding to the second line 620R is also illustrated in FIG. 6D.

The four thin curves represent the performance of an optical network architecture with split ratios of four, eight, sixteen, and thirty-two. The top curve represents the highest performance, but uses a split ratio of only four. It crosses the "good engineering practice" line at a distance of about eighteen and one-half kilometers. A split ratio of eight is the next curve down, and crosses the "good engineering practice" threshold at about five and one-half kilometers. If the "risky" limit is used, a four way split will usually not be limited by SRS, and an eight way split can work to about nine kilometers. But recall that this limit is at the threshold of visibility, so when combined with other impairments, one could introduce visible degradation that is impossible to get out of the resultant TV picture.

The sixteen way split will cross the "risky" threshold, but at such short distances as to be completely impractical, and the thirty-two split ratio will not intersect even the "risky" threshold. In light of this graph, practical split ratios for conventional Passive Optical Networks (PONs) which are unlike the active optical network of the present invention, it is not feasible to put two sets of broadcast signals on two wavelengths on the same fiber.

Second Exemplary Multiple Service Provider Optical Architecture derived from Base Architecture 100

Referring now to FIG. 7A, this figure is a functional block diagram illustrating an optical network architecture 100B in which electrical broadcast signals are generated with block conversion and then modulated onto analog optical carriers which are combined at the data service hub 110 so that the analog optical carriers are propagated along a single optical waveguide 160 according to a second exemplary embodiment of the present invention. Since FIG. 7A has many components that are similar to those illustrated in FIG. 6A, only the differences between FIG. 6A and FIG. 7A will be discussed below.

To produce the electrical broadcast signals for one service provider 103, such as the second service provider 103B, a first block converter 705A can be used. The block converter 705A can comprise a mixer 710, a local oscillator 715, and a high pass electrical signal filter 720.

The first block converter 705A can be of conventional design and well known to those skilled in the art. The first block converter 705A can accept a frequency spectrum from the second service provider 103B that ranges in frequency from 54 to about 870 MHz according to one preferred and exemplary embodiment that mirrors current industry practice. The incoming frequency spectrum can be mixed with the local oscillator (L.O.) 715 in mixer 710, to produce a frequency spectrum ranging from 1054 to 1870 MHz in one preferred and exemplary embodiment. Other frequency translations are not beyond the scope and spirit of the present invention and are known to those skilled in the art.

The high pass filter (HPF) 720 can be used to remove any power from the input frequency spectrum that may get through mixer 710. All of these components can be of conventional design and are well known to those skilled in the art.

Those skilled in the art recognize that a well performing frequency for the local oscillator 715 is usually above the band to which the input is being converted. This results in an inversion of the spectrum. This inversion can be seen from the spectrum representations illustrated in FIGS. 7B and 7C, discussed in further detail below. The lower amplitude digital signals can be propagated at the high end of the frequency band as is customary in the frequency spectrum for RF signals modulated onto the first wavelength of the first optical carrier, whereas lower amplitude digital signals can be propagated at the low end of the frequency-translated spectrum of the second wavelength of the second optical carrier as illustrated in FIG. 7C.

This is understood by those skilled in the art, and can be seen by performing the mathematics performed by mixer 710 when the device takes the difference between the incoming signals and the frequency of the local oscillator 715.

For the low frequency (54 MHz) end of the incoming spectrum:

$$f_o = f_{LO} - f_{in}$$
$$= 1924 - 54$$
$$= 1870 \text{ MHz}.$$

For the high end (870 MHz) of the incoming spectrum:

$$f_o = f_{LO} - f_{in}$$
$$= 1924 - 870$$
$$= 1054 \text{ MHz}.$$

These calculations demonstrate that the incoming frequency band is inverted by the mixing process, as is understood by those skilled in the art. The electrical broadcast signals from first service provider 103A are directly modulated onto optical transmitter 325a. Meanwhile, the electrical broadcast signals from the second service provider 103B are frequency translated with block converter 705, and are then use to modulate optical transmitter 325b, which may be optimized to operate with signals in the 1054 to 1870 MHz spectrum.

Instead of being combined in the WDM 610 at the laser transceiver node 120, the analog optical carriers having different first and second wavelengths λ1 and λ2 from the first and second service providers 103A, 103B are combined in a WDM or combiner 610 that is located within the data service hub 110. In this way, upon exiting the data service hub 110, the analog optical carriers of different wavelengths are propagated along a single optical waveguide 160.

At the proximate optical network 135, the digital optical carrier propagated along the waveguide 170 can be combined with the two or more optical carriers propagated along the waveguide 160. The digital optical carrier and analog optical carriers can be combined with a diplexer 420. Prior to combining the digital optical carrier with the analog optical carriers, the digital optical carrier can be processed with the hardware or software (or both) of the laser transceiver node 120 that is discussed above with respect to FIG. 4. The rectangular box in FIG. 6A labeled "Digital Processing of FIG. 4," indicates that all or some of the processing stages from FIG. 4 can be present in the laser transceiver node 120 of FIG. 6A. In one exemplary embodiment, the diplexer 420 can be located in a laser transceiver node 120 (not illustrated) that is part of the proximate optical network 135. However, it is not beyond the scope and spirit of the present invention to position the diplexer in another housing other than the laser transceiver node 120.

At the subscriber optical interface 140, the service provider selection device 101 can comprise an optical band pass filter 605 and the second block converter 705B illustrated in FIG. 7A. If the second service provider 103B has been chosen by the subscriber, the optical bandpass filter 605 of the service provider selection device 101 is tuned or adjusted to pass the second optical carrier of the second wavelength λ2 instead of the first optical carrier of the first wavelength λ1.

The second optical carrier can be processed and converted back to the electrical domain by the analog optical receiver 525. The electrical broadcast signals are then passed to the second block converter 705B of the service provider selection device 101, which can convert the electrical broadcast signals back to their original frequency band for reception on the subscriber's Broadcast receiver 117 such as a subscriber's TV or radio.

Referring now to FIGS. 7B and 7C, these figures are graphs 725A, 725B illustrating the exemplary frequency spectrum 730A of the first wavelength for a first analog optical carrier of a first service provider 103A and the exemplary frequency spectrum 730B of the second wavelength after block conversion for a second analog optical carrier of a second service provider 103B. The frequency spectrums 730A, 730B of FIGS. 7B and 7C are different because the frequency spectrum 730B of the second service provider 103B has undergone a frequency translation because of block conversion as discussed in detail above with respect to FIG. 7A. The incoming frequency spectrum of 54 MHz to 870 MHz is inverted or translated into the frequency spectrum of 1054 MHz to 1870 MHz as illustrated in FIG. 7C.

Third Exemplary Multiple Service Provider Optical Architecture derived from Base Architecture 100

Referring now to FIG. 8A, this Figure is a functional block diagram illustrating an exemplary multiple service provider optical network architecture 100C in which electrical broadcast signals are generated with block conversion and combined and then modulated onto a single analog optical carrier which is propagated along a single optical waveguide 160 according to a third exemplary embodiment of the present invention. Since FIG. 8A has many components that are similar to those illustrated in FIG. 7A, only the differences between FIG. 7A and FIG. 8A will be discussed below.

To produce the electrical broadcast signals for one service provider 103, such as the second service provider 103B, a first block converter 705A can be used. The block converter 705A can comprise a mixer 710, a local oscillator 715, and a high pass electrical signal filter 720, similar to the converter 705A discussed above with respect to FIG. 7A.

Instead of combining separate analog optical carriers together as illustrated in FIG. 7A, the electrical broadcast signals produced by the first and second service providers 103A, 103B are combined with an electrical diplexer 612 after block conversion of one frequency spectrum but just prior to modulation of the electrical broadcast signals onto an analog optical carrier. The combined electrical broadcast signals are used to modulate a single optical transmitter 325 so that upon exiting the data service hub 110, the single analog optical carrier having one wavelength and comprising the two different electrical broadcast signals is propagated along a single optical waveguide 160.

At the proximate optical network 135, the digital optical carrier propagated along the waveguide 170 can be combined with the single optical carrier propagated along the waveguide 160. The digital optical carrier and analog optical carrier can be combined with another combiner 610. In one exemplary embodiment, the combiner can be located in a laser transceiver node 120 (not illustrated) that is part of the proximate optical network 135. However, it is not beyond the scope and spirit of the present invention to position the optical combiner 610 in another housing other than the laser transceiver node 120.

In this exemplary embodiment illustrated in FIG. 8A, the subscriber optical interface 140 has a service provider selection device 101B that comprises the second block converter 705B illustrated in this Figure. If the second service provider 103B is desired by the subscriber, the service provider selection device 100B can convert the inverted frequency spectrum of the second electrical broadcast signals back into their original frequency spectrum, as discussed above with respect to FIG. 7A. However, if the first service provider 103A is desired by the subscriber, the service provider selection device 101B can be deactivated or alternatively, the service provider selection device 101B is not installed in the subscriber optical interface 140.

FIG. 8B is a graph 805 illustrating the exemplary frequency spectrums of analog optical carriers of two different wavelengths that support signals of a first and second service provider 103A, 103B through block conversion as described above with respect to the exemplary multiple service provider optical architecture illustrated in FIG. 8A. This graph 805 is similar to the graphs 725A, 725B of FIGS. 7B and 7C. Basically, graph 805 of FIG. 8B combines the data contained in graphs 725A and 725B of FIGS. 7B and 7C.

Graph 805 illustrates the exemplary frequency spectrum 810A of the first wavelength for a first analog optical carrier of a first service provider 103A and the exemplary frequency spectrum 810B of the second wavelength after block conversion for a second analog optical carrier of a second service provider 103B.

The frequency spectrums 810A and 810B are different because the frequency spectrum 810B of the second service provider 103B has completed a frequency translation because of block conversion, similar to and as discussed in detail above with respect to FIG. 7A. The incoming frequency spectrum of 54 MHz to 870 MHz is inverted or translated into the frequency spectrum of 1054 MHz to 1870 MHz as illustrated in FIG. 7C.

Fourth Exemplary Multiple Service Provider Optical Architecture derived from Base Architecture 100

Figures 9A, 9B, 9C:
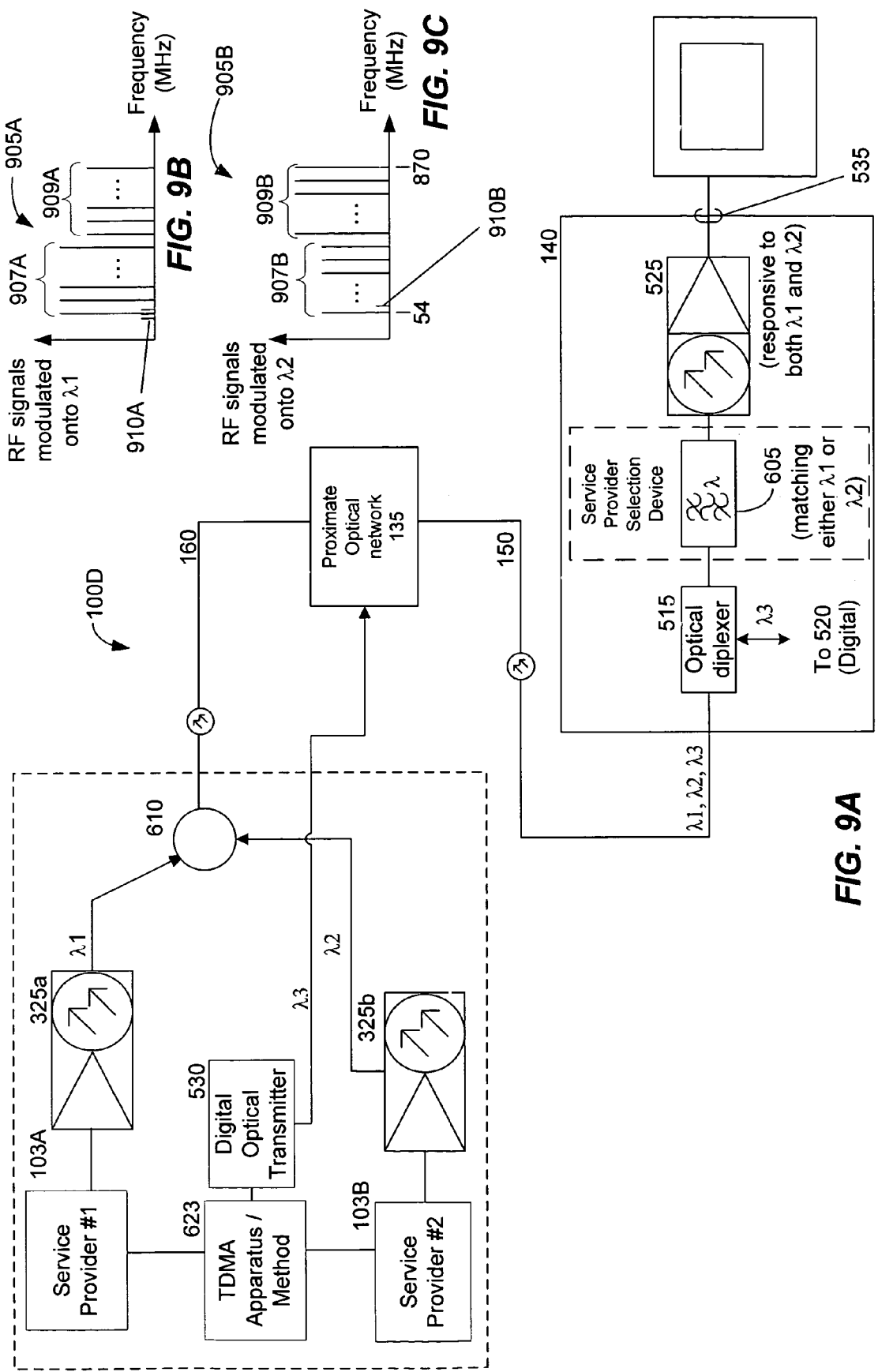
FIG. 9A is a functional block diagram illustrating an optical network architecture in which electrical broadcast signals are generated such that frequency spectrums of each optical carrier complement each other and are then modulated onto analog optical carriers which are combined at the data service hub so that the analog optical carriers are propagated along a single optical waveguide according to a fourth exemplary embodiment of the present invention.
FIG. 9B is a graph illustrating an exemplary frequency spectrum of a first wavelength for a first analog optical carrier of a first service provider who may use the exemplary multiple service provider optical architecture illustrated in FIG. 9A.
FIG. 9C is a graph illustrating an exemplary frequency spectrum of a second wavelength of a second analog optical carrier for a second service provider who may use the exemplary multiple service provider optical architecture illustrated in FIG. 9A.

Referring now to FIG. 9A, this Figure is a functional block diagram illustrating an exemplary multiple service provider optical network architecture 100D in which electrical broadcast signals are generated such that frequency spectrums of each optical carrier complement each other and are then modulated onto analog optical carriers which are combined at the data service hub 110 so that the analog optical carriers are propagated along a single optical waveguide according to a fourth exemplary embodiment of the present invention. Since FIG. 9A has many components that are similar to those illustrated in FIG. 7A, only the differences between FIG. 7A and FIG. 9A will be discussed below.

Unlike the exemplary embodiment illustrated in FIG. 7A, the data service hub 110 and subscriber optical interface 140 of FIG. 9A do not include a block converter 705. Instead, the frequency spectra of the first service provider 103A and the second service provider 103B are coordinated between the two service providers. In conventional technology, it is common to provide some electrical broadcast services using analog modulation and to provide some using digital modulation. The digital modulation electrical signals may be carried at lower amplitude as is understood by those skilled in the art. Also, those skilled in the art recognize that the digitally modulated electrical broadcast signals are modulated onto radio-frequency (RF) carriers prior to converting the signals into the optical domain.

The digital modulation signals are less susceptible to noise and interference than are the analog-modulated electrical broadcast signals. Also, since the spectrum of the digital-modulated carriers is spread out over a wider frequency range, the impact on the analog signals is lower, as is understood by those skilled in the art.

Referring to FIGS. 9A, 9B, and 9C, the first service provider 103A can transmit his analog channels at higher amplitude and in the lower portion 907A of the spectrum, as shown by the frequency spectrum 905A illustrated in FIG. 9B. The first service provider 103A transmits digital-modulated channels in the upper portion 909A of the frequency spectrum 905A as shown in FIG. 9B. The second service provider 103B, on the other hand, does the opposite, as illustrated in FIG. 9C. The second service provider 103B transmits his analog-modulated channels in the higher portion 909B of the frequency spectrum or band 905B, and transmits his digital-modulated channels in the lower portion 907B of the frequency spectrum.

The higher frequency but lower amplitude, digital-modulated channels are shown as discrete carriers for explanation, but those skilled in the art understand that the actual spectrum is spread over an entire 6 MHz (in North America) channel. A common practice is to use the spectrum from 54-550 MHz for analog-modulated carriers, and the spectrum from 550-870 MHz for digital-modulated carriers. These frequencies are shown on the lower spectrum diagram in FIG. 9C.

The effect of channel 2 is shown in FIGS. 9B and 9C as it impacts each service provider. The first service provider experiences an SRS-induced beat 910A on his channel 2, from the digital-modulated carrier that the second service provider 103B is putting on his wavelength. But the second service provider 103B is carrying his digital signal nominally 6 dB lower than his analog signals, according to a preferred exemplary embodiment and common practice.

Because the digital signal of the second service provider 103B is carried 6 dB lower in amplitude, the interference 910A on the first service provider's channel 2 is 6 dB lower than what it would be had the second service provider been carrying an analog-modulated electrical signal on channel 2. Also, the beat 910A as illustrated in FIG. 9B is spread out over a wider frequency range, and those skilled in the art recognize that the interference potential of a signal spread over a range of frequencies is lower than if the signal was concentrated at one frequency, as is the case with the analog signal.

Looking at frequency spectrum 905B of FIG. 9C, this spectrum shows the SRS-induced interference experienced by second service provider 103B as a result of the first service provider's analog-modulated signal 910B. Since the source of the interference is an analog-modulated signal, the interference appears as a substantially CW carrier (the frequency has been shifted to clearly show the interference). However, since the desired modulation is digital, and since digital modulation is much less susceptible to interference and noise, the signal will be recovered satisfactorily by the subscriber's receiver anyway.

Since SRS impacts the lowest frequency channels more than it impacts the higher frequency channels, it may be possible to overlap some analog-modulated carriers near the center of the spectrum. This would allow both service providers to offer more analog-modulated channels. As discussed above, the advantage of analog-modulated electrical broadcast services is that they can be tuned without a special set top terminal (STT), which can reduce overall system costs and reduce subscriber headaches.

It is noted that the bandwidth illustrated in FIGS. 9B and 9C does not need to be divided in halves as shown. It may be preferable for the first service provider to transmit analog-modulated programs on even numbered channels and digital-modulated programs on odd numbered channels. The second service provider can then transmit his channels in a manner that is opposite to the first service provider. The advantage of this arrangement is that each service provider can gain analog access to about the same number of channels that can be tuned without a STT, when the subscriber has a TV that does not tune all channels without a STT.

In addition to the frequency plan shown in FIGS. 9B and 9C, both the first service provider and the second service provider can transmit digital modulated signals in the lower frequency portion of the spectrum (lower portion 907B), and transmit analog signals in the upper portion (upper portion 909B) of the spectrum. In other words, the signals from both the first service provider and the second service provider can look as shown in FIG. 9C according to one alternate exemplary embodiment. The reason this works is that the SRS distortion is strongest in the lower frequency portion of the spectrum. Digital modulated signals generate less distortion because they are transmitted at a slightly lower power (as indicated by the shorter lines in FIGS. 9B and 9C), and also they are not as susceptible to being degraded by distortion as are analog signals.

Fifth Exemplary Multiple Service Provider Optical Architecture derived from Base Architecture 100

Figure 10:
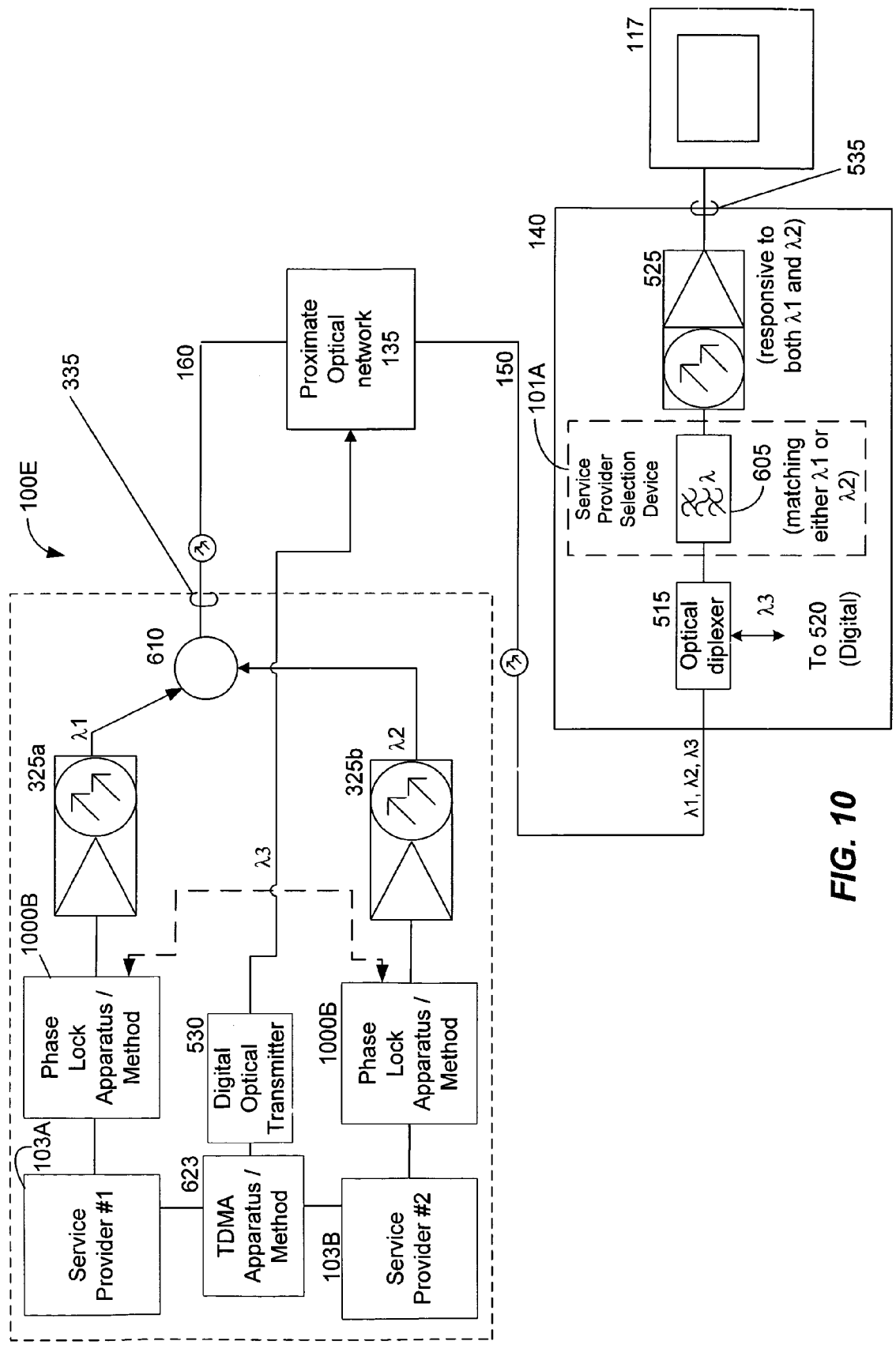
FIG. 10 is a functional block diagram illustrating an optical network architecture in which electrical broadcast signals are generated with a phase lock and then modulated onto analog optical carriers which are combined at the data service hub so that the analog optical carriers are propagated along a single optical waveguide according to a fifth exemplary embodiment of the present invention.

Referring now to FIG. 10, this Figure is a functional block diagram illustrating an optical network architecture 100E in which electrical broadcast signals are generated with a phase lock and then modulated onto analog optical carriers which are combined at the data service hub 110 so that the analog optical carriers are propagated along a single optical waveguide according to a fifth exemplary embodiment of the present invention. Since FIG. 10 has many components that are similar to those illustrated in FIG. 9A, only the differences between FIG. 9A and FIG. 10 will be discussed below.

The data service hub 110 in FIG. 10 can comprise a phase lock system 1000A, 1000B for each respective service provider 103A, 103B. Phase locking systems 1000 and techniques are known and have been widely available in the cable TV industry. The object of such systems is to use the RF carrier of, for example, the first service provider 103A, as a reference to phase lock the RF carrier of the second service provider 103B. This technique can yield a reduction of the visible artifacts of the beat product by about 5 dB.

Referring briefly back to FIG. 6D that is discussed above, this Figure illustrates the computed distance vs. split ratio that provides both the good engineering practice of 65 dB desired to undesired ratio, and also a more relaxed 60 dB. And now, referring back to FIG. 10, with the phase locking system of FIG. 10, it would be possible to achieve the longer reaches of the "risky" limit illustrated in FIG. 6D, while maintaining the conservatism of the "good engineering practice" limit also illustrated in FIG. 6D.

Sixth Exemplary Multiple Service Provider Optical Architecture derived from Base Architecture 100

Figure 11:
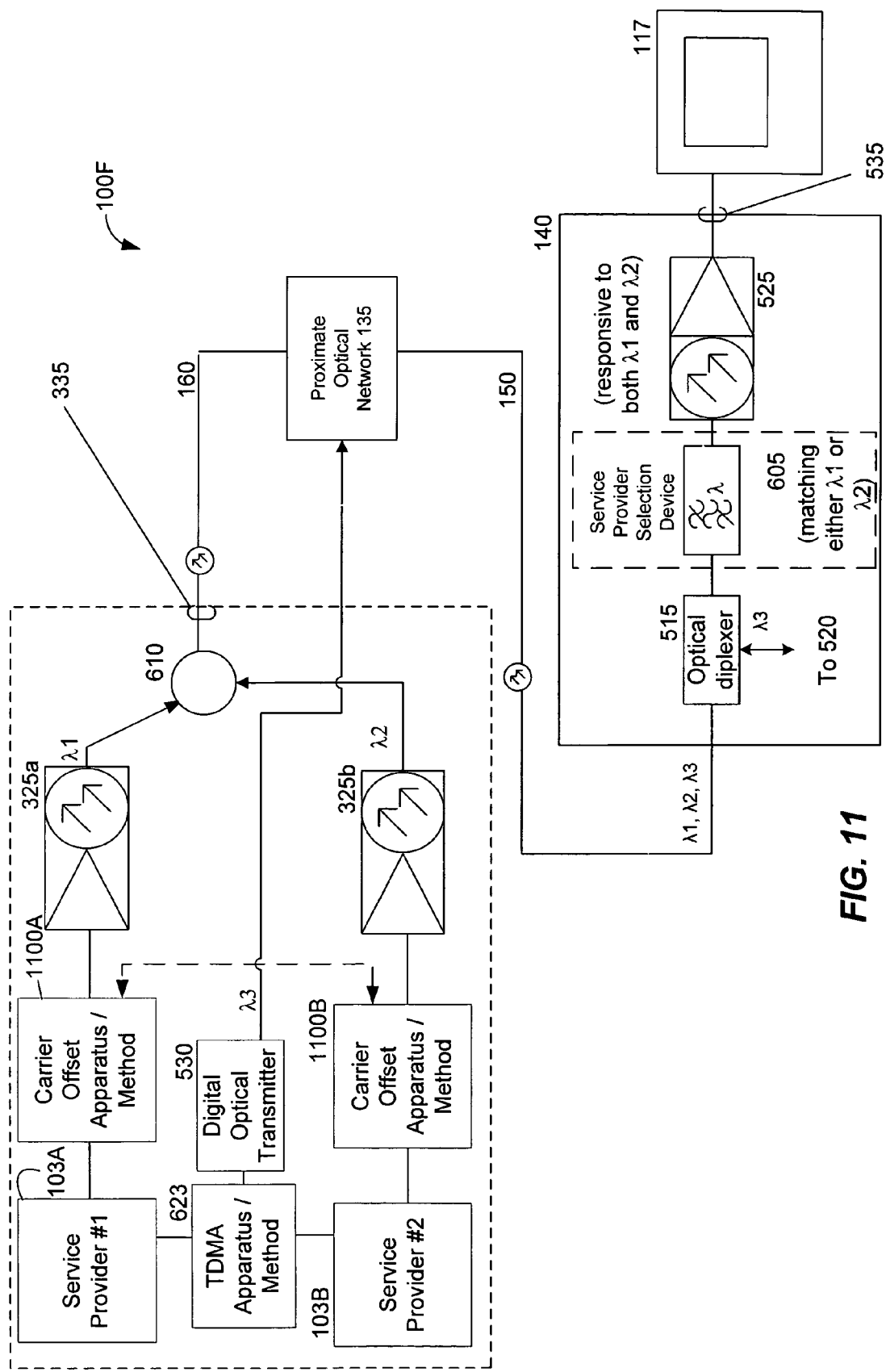
FIG. 11 is a functional block diagram illustrating an optical network architecture in which electrical broadcast signals are generated with a carrier offset and then modulated onto analog optical carriers which are combined at the data service hub so that the analog optical carriers are propagated along a single optical waveguide according to a sixth exemplary embodiment of the present invention.

Referring now to FIG. 11, this figure is a functional block diagram illustrating an optical network architecture 100F in which electrical broadcast signals are generated with a carrier offset and then modulated onto analog optical carriers which are combined at the data service hub 110 so that the analog optical carriers are propagated along a single optical waveguide according to a sixth exemplary embodiment of the present invention. Since FIG. 11 has many components that are similar to those illustrated in FIG. 10A, only the differences between FIG. 10A and FIG. 11 will be discussed below.

The data service hub 110 in FIG. 11 can comprise a carrier offset system 110A, 110B for each respective service provider 103A, 103B. Carrier offset systems 1100 and techniques are known and have been also widely available in the cable TV industry similar to the phase lock systems 1000 discussed above with respect to FIG. 10.

With a carrier offset system 1100, a precision offset between the analog RF carrier frequencies can be used. One preferred and exemplary offset is 7.5 kHz, which places the beat produced by the undesired signal at a point in the frequency spectrum where its visibility is low. This is the same philosophy that caused the FCC many years ago to set up off-air TV channel allocations with a 10 kHz offset between stations where those stations might potentially interfere with each other in fringe areas.

Precision offsets are known to those of ordinary skill in the art. Under an offset system 1100, the two RF carrier frequencies on the same channel, from the first service provider 103A and second service provider 103B, are mixed together to form a difference signal. This difference signal is then compared with a precision offset, such as the suggested 7.5 kHz reference signal, using a conventional phase locked loop (PLL) circuit. The calculated error call then be supplied to one of the service providers 103 as a control signal.

Seventh Exemplary Multiple Service Provider Optical Architecture derived from Base Architecture 100

Figure 12:
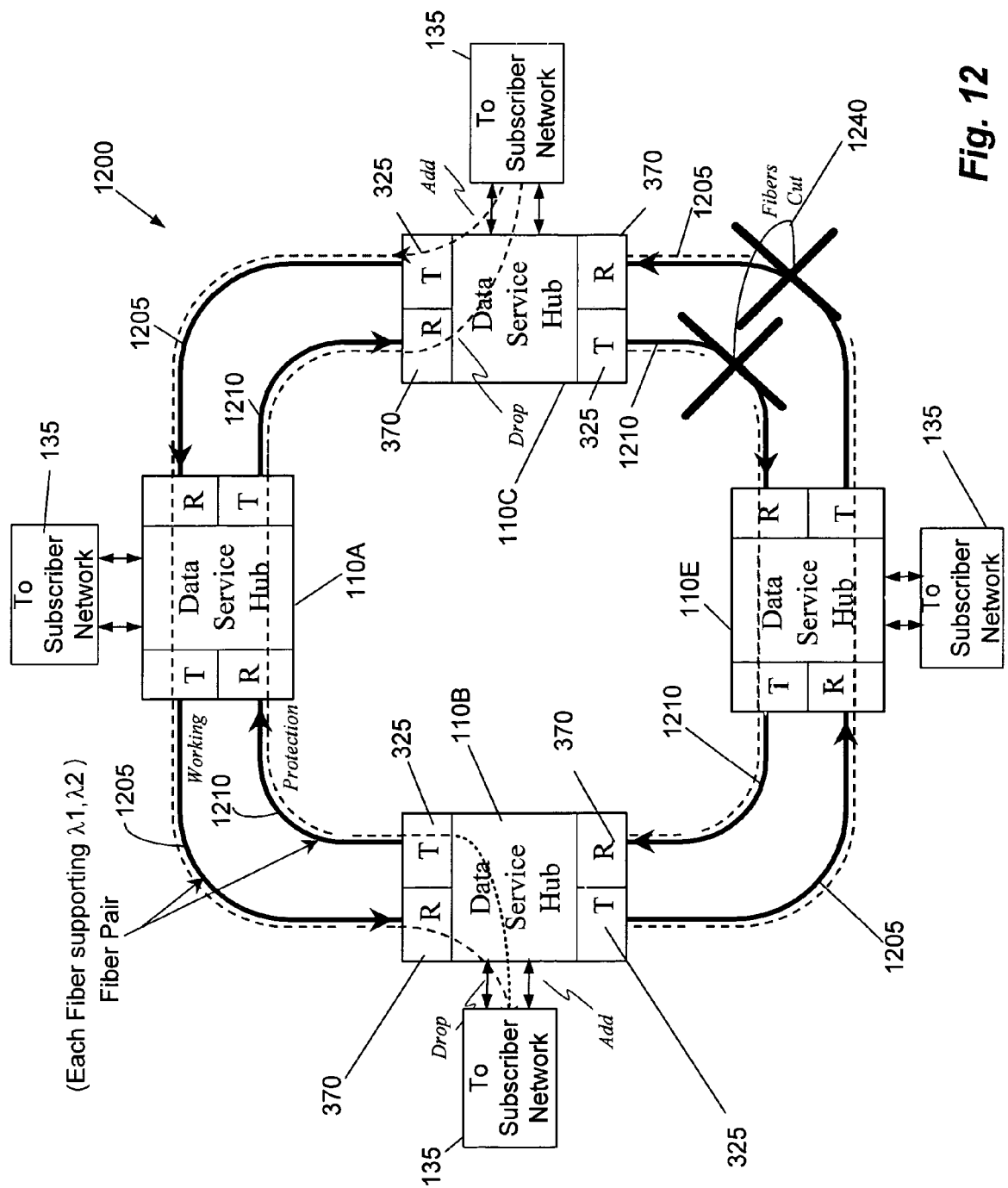
FIG. 12 is a functional block diagram illustrating a ring optical network architecture according to a seventh exemplary embodiment of the present invention.

Referring now to FIG. 12, this Figure is a functional block diagram illustrating a ring optical network architecture 1200 according to a seventh exemplary embodiment of the present invention. In this embodiment, a plurality of service providers 103 residing in data service hubs 110 can be interconnected in an optical ring architecture 1200 where single optical waveguides 1205 and 1210 can support the optical signals (both digital and analog) of the plurality of service providers using one or more of the techniques discussed above with respect to the first through sixth exemplary embodiments illustrated in FIGS. 6 through 11.

In this way, a data service hub 110 coupled to a proximate optical network 135 can supply analog optical carriers from service providers residing in different data service hubs 110.

Methods for Supporting Multiple Service Providers

The processes and operations described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Method for Supporting Multiple Service Providers—First Exemplary Embodiment

Figure 13:
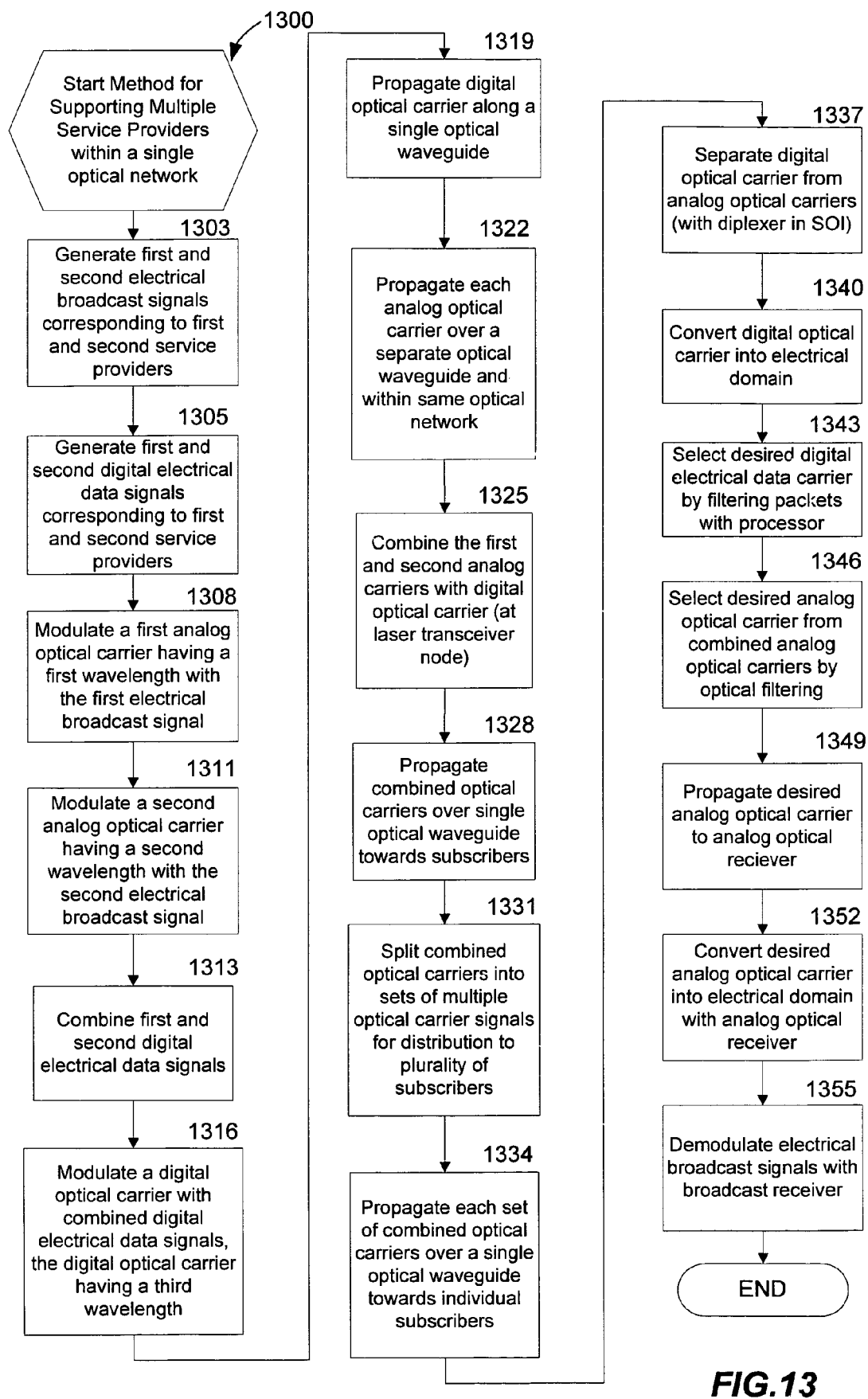
FIG. 13 is a logic flow diagram illustrating an exemplary method for supporting multiple service providers with respective analog optical carriers propagated at different wavelengths on a single optical network using separate optical waveguides deep in the network according to the first exemplary embodiment of the present invention illustrated in FIG. 6.

Referring now to FIG. 13, this figure is a logic flow diagram illustrating an exemplary method 1300 for supporting multiple service providers 103 within a single optical network 100A using separate optical waveguides 160 in the network according to a first exemplary embodiment of the present invention.

The steps of method 1300 generally correspond with the optical network architecture 100A illustrated in FIG. 6. Step 1303 is the first step of method 1300 in which first and second electrical broadcast signals corresponding to the first and second service providers 103 can be generated. Each of the electrical broadcast signals can comprise a spectrum of signals generally extending from 54 to 870 MHz. As noted above, the electrical broadcast signals can include, but are not limited, analog electrical radio-frequency (RF) signals as well as digital electrical broadcast signals that are modulated on to RF carriers. The digital electrical broadcast signals can comprise high density television (HDTV) signals and other like signals. The analog electrical radio-frequency signals can comprise television signals as well as radio signals.

Next, in step 1305 first and second digital electrical signals corresponding to the first and second providers 103 can also be generated. However, as discussed above, it is also recognized that the service providers generating the electrical broadcast signals could be different from the service providers generating the electrical digital signals for data. In other words, a first service provider could provide broadcast services while a second service provider could provide data services and third service provider could provide voice services. All three service providers could support an individual subscriber. This generation of digital electrical data signals by service providers different from the service providers who generate electrical broadcast signals applies to all of the embodiments discussed above and below in this document.

In step 1308 a first analog optical carrier having a first wavelength is modulated with the first electrical broadcast signal. Step 1308 generally corresponds to an electrical broadcast signal from the first service provider 103A modulating the optical transmitter 325A.

In step 1311, a second analog optical carrier having a second wavelength can be modulated with the second electrical broadcast signal. Step 1311 generally corresponds with the second service provider 103B producing an electrical broadcast signal that modulates the second optical transmitter 325B.

Next in step 1313, the first and second digital electrical data signals can be combined. These digital electrical data signals can be combined using a time division multiple access method or apparatus (or both) 623 as illustrated in FIG. 6A and discussed above. However, other methods for combining the digital electrical signals such that they modulate a single digital optical carrier are not beyond the scope and spirit of the present invention.

In step 1316, the combined digital electrical data signals can modulate a digital optical carrier. This digital optical carrier can have an optical wavelength that is different that the one or more analog optical carriers discussed above. In step 1319, the digital optical carrier can be propagated along a single optical waveguide 170. In step 1322, each analog optical carrier can be propagated over a separate optical waveguide 160a, 160b and within the same optical network 100A.

In step 1325, the first and second analog carriers propagating along the separate optical waveguides 160a, 160b can be combined with the digital optical carrier at the laser transceiver mode 120 by using a diplexer 420 as discussed above with respect to FIG. 4. Next, in step 1328, the combined optical carriers can then be propagated over a signal optical waveguide 150 towards subscribers that may have subscriber optical interfaces 140.

In step 1331, the combined optical carriers can be split into multiple optical carrier signals for distribution to a plurality of subscribers. Step 1331 can generally correspond with the splitter 510 that can be part of the laser transceiver node 120. Step 1331 can also correspond with the optical tap 130 where optical signals can be further split and propagated along separate optical waveguides 150.

In step 1334, each set of combined optical carriers is propagated over a single optical waveguide 150 towards individual subscribers having subscriber optical interfaces 140. In step 1337, digital optical carrier can be separated from the analog optical carriers with the optical diplexer 515 of the subscriber optical interface 140.

In step 1340, the digital optical carrier that is diverted by the optical diplexer 515 can be converted by a digital optical receiver 525 into the electrical domain. The desired electrical data carrier can then be selected by the processor 550 (see FIG. 5) or telephone or other device (or a combination thereof) in step 1343 by filtering packet data. In step 1346, a desired analog optical carrier can be selected from the combined optical carriers by optical filtering with optical filter 605. Step 1346 generally corresponds with the service provider selection device 101A as illustrated in FIG. 6A.

In step 1349, the selected and desired optical carrier can then be propagated to the analog optical receiver 525. In step 1352, the selected and desired analog optical carrier can then be converted into the electrical domain with the analog optical receiver 525. In step 1355, the electrical broadcast signals can be demodulated with a broadcast receiver 117 such as a subscriber's TV. The process then ends.

Method for Supporting Multiple Service Providers—Second Exemplary Embodiment

Figure 14:
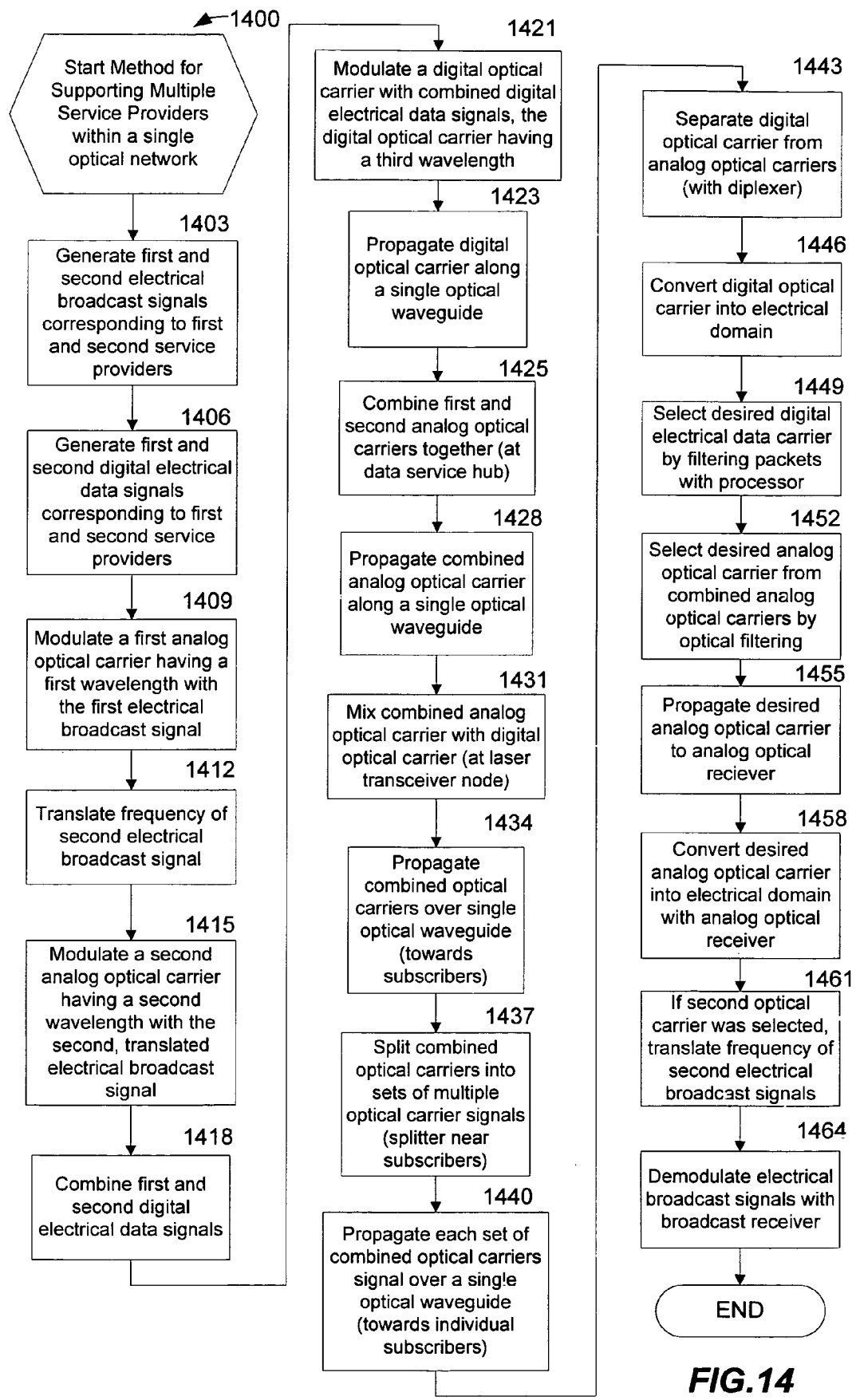
FIG. 14 is a logic flow diagram illustrating an exemplary method for supporting multiple service providers on a single optical network using block conversion and a shared, single optical waveguide according to the second exemplary embodiment of the present invention illustrated in FIG. 7.

Referring now to FIG. 14, this figure is a logic flow diagram illustrating an exemplary method 1400 for supporting multiple service providers 103 within a single optical network 100 using block conversion and a shared, single optical waveguide 150 according to a second exemplary embodiment of the present invention. The steps of method 1400 generally correspond with the optical network architecture 100B as illustrated in FIG. 7A.

Step 1403 is the first step in method 1400 in which first and second electrical broadcast signals corresponding to the first and second providers 103 are generated. Next, in step 1406, first and second digital electrical signals corresponding to the first and second service providers 103 are also generated.

In step 1409, a first analog optical carrier having a first wavelength is modulated with the first electrical broadcast signal. Step 1409 generally corresponds with the first service provider 103A modulating the first optical transmitter 325a with the electrical broadcast signals.

Next, in step 1412 a frequency spectrum of the second electrical broadcast signal is translated with a block converter 705A. Next, in step 1415, a second analog optical carrier having a second wavelength is modulated with the second translated electrical broadcast signal produced in step 1412.

In step 1418, the first and second digital electrical data signals are combined using a time division multiple access system or method (or both) 605 as discussed above. Alternatively, any equivalent system or method for combining digital electrical data signals could be employed.

In step 1421, a digital optical carrier is modulated with the combined digital electrical data signals. This digital optical carrier can have an optical wavelength that is different that the one or more analog optical carriers discussed above. Next, in step 1423, the digital optical carrier can be propagated along a single optical waveguide 170.

Similarly, in Step 1425, the first and second analog optical carriers can be combined together at the data service sub 110 with a combiner or wavelength division multiplexer 610. In step 1428, the combined analog optical carrier can be propagated along a single optical waveguide 160 towards the proximate optical network 135. Next, in step 1431, the combined analog optical carrier can be mixed with the digital optical carrier at the laser transceiver node 120 that could be part of the proximate optical network 135.

In step 1434, the combined optical carriers can be propagated over a single optical waveguide 150 towards subscribers that have subscriber optical interfaces 140. In step 1437, the combined optical carriers can be split into a plurality of multiple optical carrier signals with a slitter 510 or an optical tap 130.

Next, in step 1440 each set of combined optical carriers can be propagated over a single optical waveguide 150 toward individual subscribers having subscriber optical interfaces 140. Next, in step 1443 the digital optical carrier can be separated from the analog optical carriers with an optical diplexer 515 of the subscriber optical interface 140. In step 1446, the digital optical carrier can be converted into the electrical domain with a digital optical receiver 540.

Next, in step 1449, a desired digital electrical data carrier can be selected by filtering packet data with the processor 550. Next, in step 1452, a desired analog optical carrier can be selected from the combined optical carriers by optical filtering. Step 1452 generally corresponds to the optical band pass filter 605 that is part of the service provider selection device 101. Next, in step 1455, a desired analog optical carrier can then be propagated to an analog optical receiver 525.

In step 1458, the desired analog optical carrier can be converted into the electrical domain with the analog optical receiver 525. Next, in step 1461, if the second optical carrier is selected, then the frequency of the electrical broadcast signal corresponding to the second optical carrier can be translated with the second block converter 705B that is part of the service provider selection device 101. Next, in step 1464, the electrical broadcast signals can be demodulated with a broadcast receiver 117 such as a subscriber's TV set. The process then ends.

Method for Supporting Multiple Service Providers—Third Exemplary Embodiment

Figure 15:
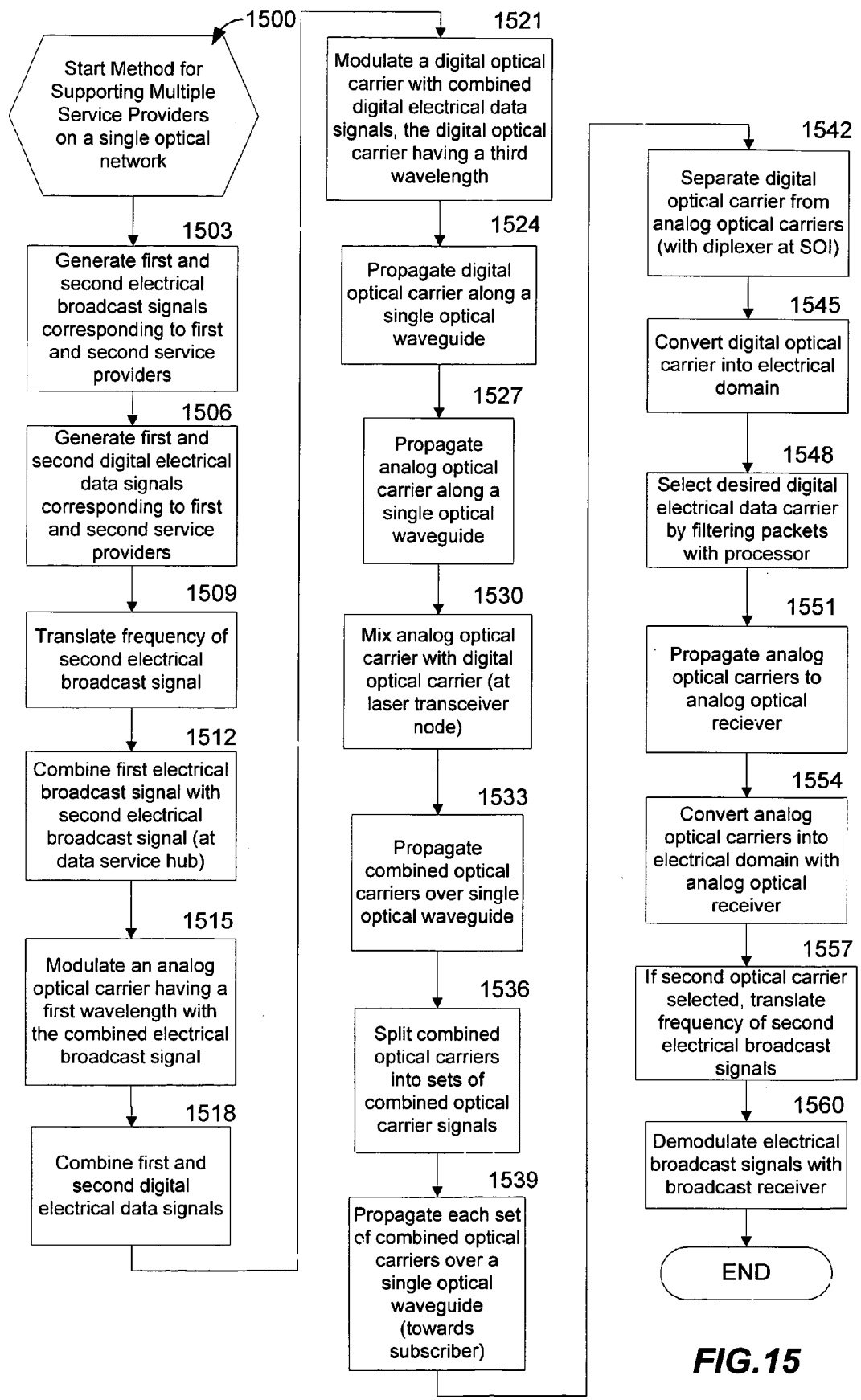
FIG. 15 is a logic flow diagram illustrating an exemplary method for supporting multiple service providers on a single optical network using block conversion and a single analog optical carrier propagated over a shared, single optical waveguide according to the third exemplary embodiment of the present invention illustrated in FIG. 8.

Referring now to FIG. 15, this figure is a logic flow diagram illustrating an exemplary method for supporting multiple service providers 103 within a single optical network 100C using block conversion and a shared, single optical waveguide 160 according to a third exemplary embodiment of the present invention. The steps of method 1500 generally correspond to the optical network architecture 100C as illustrated in FIG. 8A discussed above.

Step 1503 is the first step of method 1500 in which first and second electrical broadcast signals are generated corresponding to the first and second service providers 103A, 103B. Next, in step 1506, first and second digital electrical signals are generated corresponding to the first and second service providers 103A, 103B.

Next, in step 1509, the frequency spectrum of the second electrical broadcast signals are translated with a block converter 705A. Next, in step 1512, the first electrical broadcast signal can be combined with the second, translated RF signal at the data service sub 110 with an RF combiner or diplexer 420.

In step 1515, an analog optical carrier having a first wavelength is modulated with the combined electrical broadcast signals that exit the RF combiner or diplexer 420 in step 1512. In step 1518, the first and second digital electrical data signals are combined using a time division multiple access system or method (or both) 605 as discussed above. Alternatively, any equivalent system or method for combining digital electrical data signals could be employed.

In step 1521, a digital optical carrier is modulated with the combined digital electrical data signals. This digital optical carrier can have an optical wavelength that is different that the analog optical carrier discussed above.

In step 1524, the digital optical carrier can be propagated along a single optical waveguide 170. In step 1527, the analog optical carrier that was modulated by the first and second electrical broadcast signals can be propagated along a single optical waveguide 160. In step 1530, the analog optical carriers can be combined with the digital optical carrier at the laser transceiver node 120 or at some portion of the proximate optical network 135.

The combined optical carriers can then be propagated over a single optical waveguide 150. In step 1536, combined optical carriers propagating along the single optical waveguide 150 can be split or divided with a splitter 510 in optical taps 130. Next in step 1539, each set of combined optical carriers can be propagated over a single optical waveguide 150 towards subscriber that have subscriber optical interfaces 140.

In step 1542 the digital optical carrier can be separated from the analog optical carriers with an optical diplexer 515 of the subscriber optical interface 140. Next, in step 1545, the digital optical carrier can be converted into the electrical domain with a digital optical receiver 540 as illustrated in FIG. 5. The desired electrical data carrier can be selected by filtering the packet data with processor 550 or other electronic devices (or a combination thereof).

In step 1551, the combined analog optical carriers can be propagated to the analog optical receiver 525. Next, in step 1554, the combined analog optical carriers can be converted into the electrical domain with the analog optical receiver 525. In step 1557, if the second analog optical carrier is selected, then the frequency spectrum of the second electrical broadcast signals can be translated with a second block converter 705B as illustrated in FIG. 8A.

If the first analog carrier is selected, then no frequency conversion or translation is necessary. In step 1560, the electrical broadcast signals can be demodulated with a broadcast receiver 117 such as a subscriber's TV. The process then ends.

Method for Supporting Multiple Service Providers—Fourth Exemplary Embodiment

Figure 16:
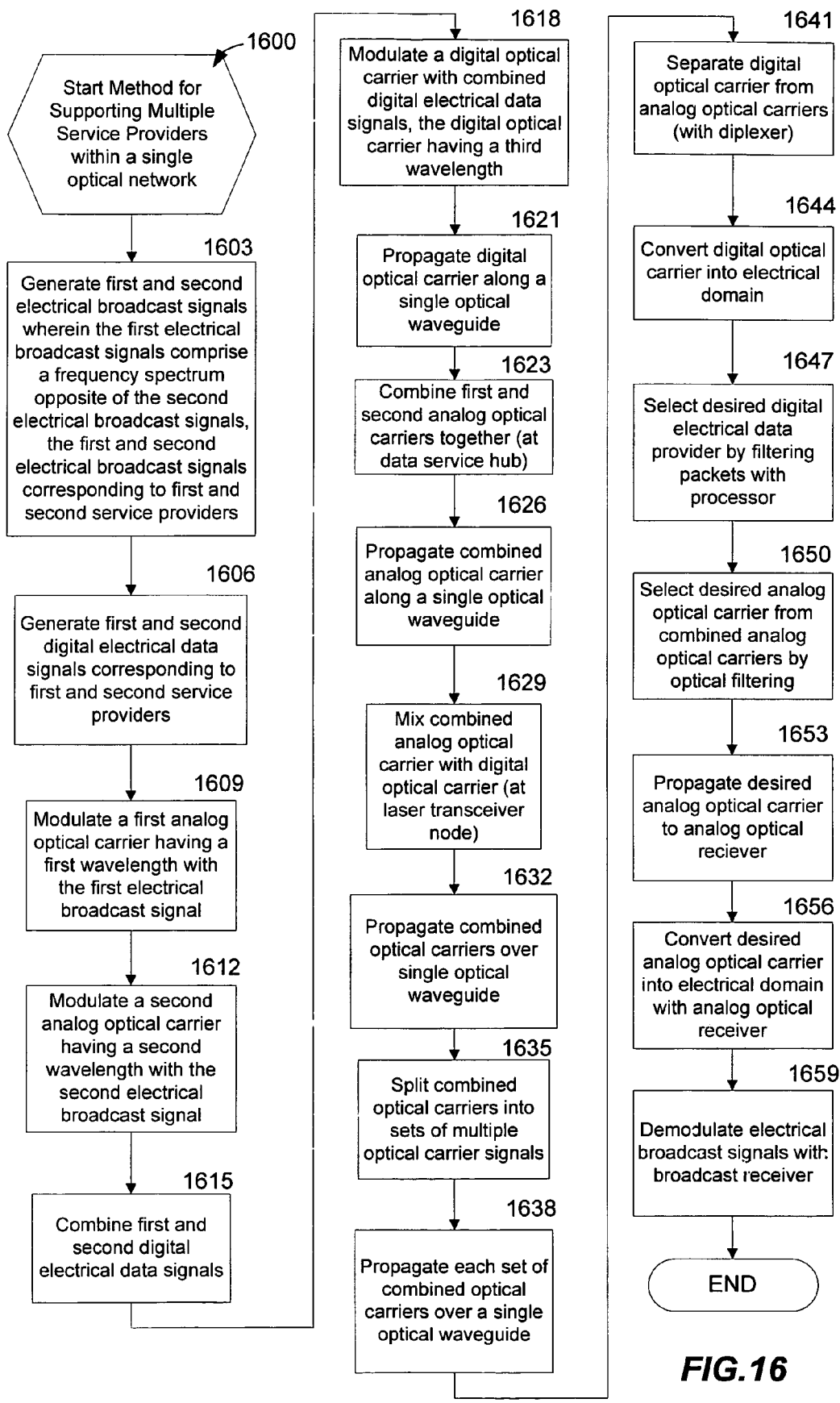
FIG. 16 is a logic flow diagram illustrating an exemplary method for supporting multiple service providers on a single optical network using frequency coordination and optical carriers with different wavelengths that are propagated over a shared, single optical waveguide according to the fourth exemplary embodiment of the present invention illustrated in FIG. 9.

Referring now to FIG. 16, this figure is a logic flow diagram illustrating an exemplary method for supporting multiple service providers 103 within a single optical network 100D using frequency coordination and optical carrier with different wavelengths that are propagated over a shared, single optical waveguide according to a fourth exemplary embodiment of the present invention. The steps of method 1600 generally correspond to the optical network architecture 100D as illustrated in FIG. 9A.

Step 1603 is the first step of method 1600 in which the first and second electrical broadcast signals are generated where the first electrical broadcast signals comprise a frequency spectrum opposite of the second electrical broadcast signals. The first and second electrical broadcast signals correspond to first and second service providers 103A, 103B. The first and second electrical broadcast signals can include both digital and analog electrical broadcast signals in this step. However, it is recognized that digital electrical broadcast signals are modulated onto an RF carrier prior to any modulation of an analog optical transmitter 325. Step 1603 generally corresponds with the frequency coordination method discussed above with respect to FIG. 9A.

In step 1606, first and second digital electrical data are generated wherein the first digital electrical broadcast signals comprise a frequency spectrum opposite to that of the second digital electrical broadcast signals. The first and second digital signals can correspond with the first and second service providers 103A, 103B but they could also be generated by third and fourth service providers as discussed above.

In step 1609, a first analog optical carrier having a first wavelength is modulated with the first electrical broadcast signal. Step 1609 generally corresponds with the first service provider 103A modulating the optical transmitter 325a with the first electrical broadcast signal.

In step 1612, a second analog optical carrier having a second wavelength can be modulated with the second electrical broadcast signal. Step 1612 generally corresponds with the second service provider 103B modulating the optical transmitter 325b with the second electrical broadcast signal.

In step 1615, the first and second digital electrical data signals are combined using a time division multiple access system or method (or both) 605 as discussed above. Alternatively, any equivalent system or method for combining digital electrical data signals could be employed.

In step 1618, a digital optical carrier is modulated with the combined digital electrical data signals. This digital optical carrier can have an optical wavelength that is different that the analog optical carrier discussed above.

In step 1621, the digital optical carrier can be propagated along a single optical waveguide 170. In step 1623, the first and second analog optical carriers can be combined at the data service sub 110 with an optical combiner or wavelength division multiplexer 610.

In step 1626, the combined analog optical carriers can then be propagated along a single optical waveguide 160. In step 1629, the combined analog optical carrier can be mixed with the digital optical carrier at the laser transceiver node 120 that forms part of the proximate optical network 135.

Next, in step 1632, the combined optical carriers can be propagated over a single optical waveguide 150. Next, in step 1635, the combined optical carriers propagating along the single optical waveguide 150 can be split or divided with an optical splitter 510 or optical tap 130 into a plurality of multiple optical carrier signals.

Next, in step 1638, each set of combined optical carriers can be propagated over a single optical waveguide 150. In step 1641, the digital optical carrier can be separated from analog optical carriers with an optical diplexer 515 of the subscriber optical interface 140.

In step 1644, the digital combined optical carriers is converted into the electrical domain with a digital optical receiver 540 as illustrated in FIG. 5. In step 1650, the desired digital electrical data provider can be selected by filtering the packets with the processor 550 or other electronics (or any combination thereof). In step 1650, the desired analog optical carrier can be selected from the combined optical carriers by optical filtering. Step 1650 generally corresponds to the service provider selection device 101A as illustrated in FIG. 9A.

In step 1653, the desired analog optical carrier selected in step 1650 can be propagated to the analog optical receiver 525. In step 1556, a desired analog optical carrier can then be converted into the electrical domain with the analog optical receiver 525. In step 1659, the electrical broadcast signals can be demodulated with a broadcast receiver 117 such as a subscriber's TV. The process then ends.

Method for Supporting Multiple Service Providers—Fifth Exemplary Embodiment

Figure 17:
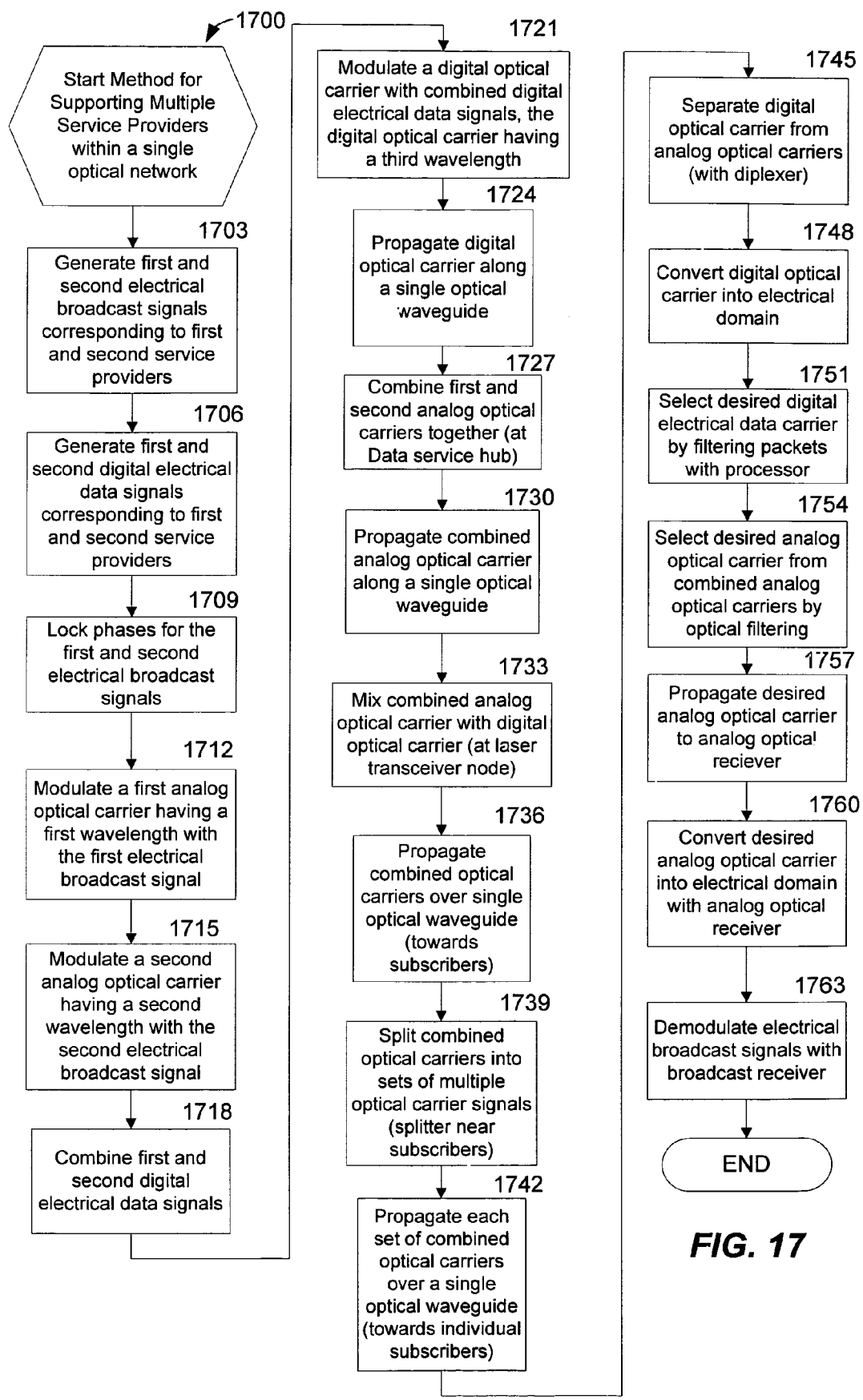
FIG. 17 is a logic flow diagram illustrating an exemplary method for supporting multiple service providers on a single optical network using a phase lock system and optical carriers with different wavelengths that are propagated over a shared, single optical waveguide according to the fifth exemplary embodiment of the present invention illustrated in FIG. 10.

Referring now to FIG. 17, this Figure is a logic flow diagram illustrating an exemplary method 1700 for supporting multiple service providers 103 within a single optical network 100E using a phase lock system 1000A and optical carriers with different wavelengths that are propagated over a shared, single optical waveguide 160 according to a fifth exemplary embodiment of the present invention. The steps of method 1700 generally correspond with the optical network architectural 100E as illustrated in FIG. 10.

Step 1703 is the first step of method 1700 in which first and second electrical broadcast signals are generated and correspond to the first and second service providers 103. Next, in step 1706, the first and second digital electrical signals are generated that correspond to the first and second service providers 103.

In step 1709, phases for the first and second electrical broadcast signals are then locked together. Step 1709 generally corresponds with the phase lock system and method 1000A-1000B as illustrated and described above with respect to FIG. 10.

In step 1712, a first analog optical carrier having a first wavelength is modulated with the first electrical broadcast signal. Next, in step 1715, a second analog optical carrier having a second wavelength is modulated with the second electrical broadcast signal.

In step 1718, the first and second digital electrical data signals are combined using a time division multiple access system or method (or both) 605 as discussed above. Alternatively, any equivalent system or method for combining digital electrical data signals could be employed.

In step 1721, a digital optical carrier is modulated with the combined digital electrical data signals. This digital optical carrier can have an optical wavelength that is different that the analog optical carriers discussed above.

In step 1724, the digital optical carrier can be propagated along a single optical waveguide 170. In step 1727, the first and second analog optical carriers can be combined together at the data service hub 110 with an optical combiner or wavelength division multiplexer (WDM) 610. Next, in step 1730, the combined analog optical carriers can then be propagated along a single optical waveguide 160.

In step 1733, the combined analog optical carrier can be mixed with the digital optical carrier at a laser transceiver node 120 that forms part of the proximate optical network 135. In step 1736, the combined optical carriers can be propagated over a single optical waveguide 150 towards subscribers.

In step 1739, the combined optical carriers propagating along the single optical waveguide 150 can be split with splitter 510 in optical taps 130. In step 1742, each set of combined optical carriers formed from the split in step 1739 can be propagated over a single optical waveguide 150 towards individual subscribers having subscriber optical interfaces 140.

In step 1745, the digital optical carrier can be separated from the analog optical carriers with an optical diplexer 515 of the subscriber optical interface 140. Next, in step 1748, the selected digital combined optical carrier from step 1745 can be converted into the electrical domain with a digital optical receiver 540. Next, in step 1751, the desired electrical carrier can be filtered by the processor 550 or other electronics (or a combination thereof).

In step 1754, the desired analog optical carrier can be selected from the combined optical carriers by optical filtering. Step 1754 generally corresponds to the service provider selection device 101A as illustrated in FIG. 10.

In step 1757, the desired analog optical carrier selected in step 1754 can be propagated to the analog optical receiver 525. In step 1760, the desired analog optical carrier can be converted in the electrical domain with the analog optical receiver 525. Then, in step 1763, the electrical broadcast signals can be demodulated with a broadcast receiver 117 that can comprise a subscriber's TV set. The process then ends.

Method for Supporting Multiple Service Providers—Sixth Exemplary Embodiment

Figure 18:
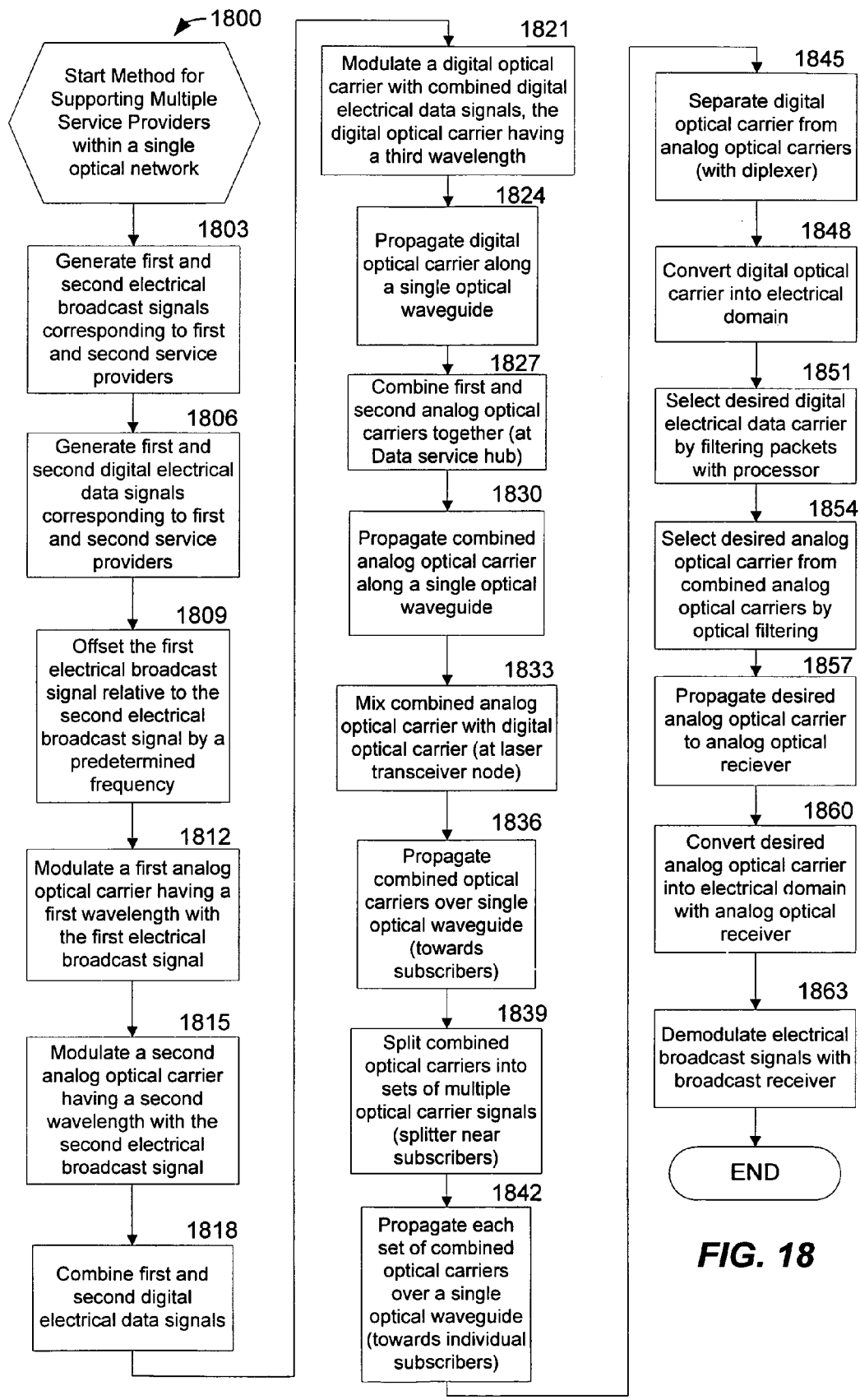
FIG. 18 is a logic flow diagram illustrating an exemplary method for supporting multiple service providers on a single optical network using a carrier offset system and optical carriers with different wavelengths that are propagated over a shared, single optical waveguide according to the sixth exemplary embodiment of the present invention illustrated in FIG. 11.

Referring now to FIG. 18, this figure is a logic flow diagram illustrating an exemplary method 1800 for supporting multiple service providers 103 within a single optical network 100F using a carrier offset system and analog optical carriers with different wavelengths that are propagated over a shared, single optical waveguide 160 according to a sixth exemplary embodiment of the present invention. The steps of method 1800 generally correspond to the optical network architecture 100F illustrated in FIG. 11.

Step 1803 is the first step in method 1800 in which first and second electrical broadcast signals corresponding to the first and second service providers 103 are generated. Next, in step 1806, first and second digital electrical signals corresponding to the first and second service providers are also generated.

In step 1809, the first electrical broadcast signals are offset relative to the second electrical broadcast signals by a predetermined frequency. Step 1809 generally corresponds with the carrier offset system and method 1100A and 1100B discussed above with respect to FIG. 11.

In step 1812, a first analog optical carrier having a first wavelength is modulated with the first electrical broadcast signal. In step 1815, a second analog optical carrier having a second wavelength is modulated with the second electrical broadcast signal.

In step 1818, the first and second digital electrical data signals are combined using a time division multiple access system or method (or both) 605 as discussed above. Alternatively, any equivalent system or method for combining digital electrical data signals could be employed.

In step 1821, a digital optical carrier is modulated with the combined digital electrical data signals. This digital optical carrier can have an optical wavelength that is different that the analog optical carriers discussed above.

In step 1824, the digital optical carrier can be propagated along a single optical waveguide 170. In step 1827, the first and second analog optical carriers can be combined at the data service sub 110 optical combiner or WDM 610.

In step 1830, the combined analog optical carrier can be propagated along a single optical waveguide 160. In step 1833, the combined analog optical carrier can be mixed with the digital optical carrier at a laser transceiver node 120 that forms part of the proximate optical network 135. The combined optical carriers can be propagated over a single optical waveguide 150 towards subscribers having subscriber optical interfaces 140.

In step 1839, the combined optical carriers can be split into a plurality of multiple optical carrier signals or the splitting can occur near the subscribers with a splitter 510 or optical tap 130. In step 1842, each set of combined optical carriers can be propagated over a single optical waveguide 150 towards individual subscribers having subscriber optical interfaces 140.

In step 1845, the digital optical carrier can be separated from the analog optical carriers with an optical diplexer 515. In step 1851, the desired digital electrical carrier can be selected by filtering packets. In other words, the processor 550 of FIG. 5 or other electronics (or a combination thereof) can select desired digital packets.

In step 1854, the desired analog optical carrier can be selected by optical filtering. Step 1854 generally corresponds with the service provider selection device 101A as illustrated in FIG. 11. In step 1857, a desired analog optical carrier can be propagated to an analog optical receiver. In step 1860, a desired analog optical carrier can be converted into the electrical domain with the analog optical receiver 525. In step 1863, the electrical broadcast signals can be demodulated with a broadcast receiver 117 such as a subscriber's TV set. The process then ends.

CONCLUSION

In summary, a system and method for communicating optical signals between a data service provider and a subscriber is provided that can eliminate the effects of SRS when multiple data service providers are sharing a single optical network using optical carriers of different wavelengths. With the invention described above, analog optical carriers of different wavelengths can be propagated for large distances in an optical network in which numerous the optical carriers can be split several times. The inventive method and system can also support both analog and digital optical carriers in order to provide video as well as data services such as internet connections and telephone services.

It is further recognized that these techniques could also be used by a single service provider to increase channel capacity. That is, instead of two service providers being present at the data service hub illustrated in the Figures, a single service provider could divide its services according to the described and illustrated architecture.

It should be understood that the foregoing relates only to illustrate the embodiments of the present invention, and that numerous changes may be made therein without departing from the scope and spirit of the invention as defined by the following claims.

What is claimed is:

1. An optical network system for supporting multiple service providers, comprising:
   a data service hub comprising:
   a first optical transmitter for modulating a first analog optical carrier having a first wavelength with a first electrical, analog broadcast radio-frequency signal of a first service provider;

a second optical transmitter for modulating a second analog optical carrier having a second wavelength with a second, analog electrical broadcast radio-frequency signal of a second service provider;

a third optical transmitter for modulating a digital optical carrier having a third wavelength with a digital data signal;

a first optical waveguide coupled to the data service hub and a laser transceiver node for receiving the first analog optical carrier and propagating it to the laser transceiver node;

a second optical waveguide coupled to the data service hub and the laser transceiver node for receiving the second analog optical carrier and propagating it to the laser transceiver node;

a third optical waveguide coupled to the data service hub and the laser transceiver node for receiving the digital optical carrier and propagating it to the laser transceiver node, the laser transceiver node comprising a first combiner for mixing the first and second analog optical carriers and a second combiner for mixing the digital optical carrier with the combined first and second analog optical carriers;

a fourth optical waveguide coupled to the laser transceiver node and a subscriber optical interface for receiving the combined first and second analog optical carriers and digital optical carrier and propagating them to the subscriber optical interface; and the subscriber optical interface comprising a service provider selection device for selecting one of the analog optical carriers.

2. The system of claim 1, wherein the subscriber optical interface comprises an analog optical receiver for converting the selected analog optical carrier into electrical, analog broadcast radio-frequency signals.

3. The system of claim 1, further comprising a broadcast receiver for demodulating analog electrical broadcast radio-frequency signals.

4. The system of claim 1, wherein the service provider selection device comprises an optical filter.

5. The system of claim 1, wherein the first combiner of the laser transceiver node comprises a wavelength division multiplexer for combining the first and second analog optical carriers.

6. The system of claim 1, wherein the subscriber optical interface comprises an optical diplexer for separating the first and second analog optical carriers from the digital optical carrier.

7. The system of claim 1, wherein the analog broadcast radio-frequency signals comprise at least one of analog television broadcast signals, analog radio broadcast signals, and high density television broadcast signals.

8. A method for supporting broadcast signals from multiple sources operating within a single optical network, comprising:

modulating a first analog optical carrier having a first wavelength with a first electrical, analog broadcast radio-frequency signal at a data service hub from a first service provider;

modulating a second analog optical carrier having a second wavelength with a second electrical, analog broadcast radio-frequency signal at the data service hub from a second service provider;

modulating a digital optical carrier having a third wavelength with digital data signal at the data service hub;

propagating the first and second analog optical carriers and digital optical carrier through separate optical waveguides away from the data service hub;

combining the first and second analog optical carriers and the digital optical carrier;

propagating the first and second analog optical carriers and digital optical carrier through one optical waveguide towards a subscriber; and selecting one of the analog optical carriers at a subscriber optical interface.

9. The method of claim 8, further comprising converting the selected analog optical carrier into electrical analog broadcast radio-frequency signals.

10. The method of claim 9, further comprising demodulating the electrical analog broadcast radio-frequency signals with a broadcast receiver.

11. The method of claim 8, wherein selecting one of the analog optical carriers at the subscriber optical interface comprises selecting one of the analog optical carriers by optical filtering.

12. The method of claim 8, wherein combining the first and second analog optical carriers comprises combining the optical signals through wavelength division multiplexing.

13. The method of claim 8, further comprising separating the first and second analog optical carriers from the digital optical carrier at a subscriber optical interface.

14. A system for supporting broadcast signals from multiple service providers operating within a single optical network, comprising:

a data service hub comprising:
a first optical transmitter for modulating a first analog optical carrier having a first wavelength with a first electrical, analog broadcast radio-frequency signal of a first service provider;

a block converter for translating a frequency range of a second electrical, analog broadcast radio-frequency signal of a second service provider;

a second optical transmitter for modulating a second analog optical carrier having a second wavelength with the second electrical, analog broadcast radio-frequency signal;

a combiner for mixing the first and second analog optical carriers;

a first optical waveguide for communicating the first and second analog optical carriers to a node;

a third optical transmitter for modulating a digital optical carrier having a third wavelength with a digital data signal;

a second optical waveguide coupled to the data service hub and the laser transceiver node for receiving the digital optical carrier and propagating it to the node; and a subscriber optical interface coupled to the node and comprising a service provider selection device for selecting one of the analog optical carriers.

15. The system of claim 14, wherein the subscriber optical interface further comprises an analog optical receiver for converting the selected analog optical carrier into an electrical, analog broadcast radio-frequency signal.

16. The system of claim 14, wherein the service provider selection device comprises a block converter.

17. The system of claim 14, further comprising a broadcast receiver for demodulating electrical, analog broadcast radio-frequency signals.

18. The system of claim 14, wherein the service provider selection device comprises an optical filter.

19. The system of claim 14, wherein the combiner comprises a wavelength division multiplexer.

20. The system of claim 14, wherein the node further comprises a diplexer for mixing the first and second analog optical carriers with the digital optical carrier.

21. The method of claim 14, wherein the subscriber optical interface comprises a diplexer for separating the first and second analog optical carriers from the digital optical carrier.

22. The system of claim 14, wherein the electrical, analog broadcast radio-frequency signals comprise at least one of analog television broadcast signals, analog radio broadcast signals, and high density television broadcast signals.

23. The system of claim 14, wherein the service provider selection device comprises a block converter, the block converter comprising a local oscillator, a mixer, and a filter.

24. A method for supporting broadcast signals from multiple service providers operating within a single optical network, comprising:
    modulating a first analog optical carrier having a first wavelength with a first electrical, analog broadcast radio-frequency signal of a first service provider at a data service hub;
    translating a frequency range of a second electrical, analog broadcast radio-frequency signal of a second service provider;
    modulating a second analog optical carrier having a second wavelength with the second electrical, analog broadcast radio-frequency signal at the data service hub;
    combining the first and second analog optical carriers at the data service hub;
    propagating the first and second analog optical carriers through a first optical waveguide towards a subscriber;
    modulating a digital optical carrier having a third wavelength with a digital data signal at the data service hub;
    propagating the digital optical carrier through a second optical waveguide towards a subscriber; and
    selecting one of the analog optical carriers at a subscriber optical interface.

25. The method of claim 24, further comprising converting the selected analog optical carrier into an electrical, analog broadcast radio-frequency signal.

26. The method of claim 25, further comprises translating a frequency range of the converted electrical, analog broadcast radio-frequency signal.

27. The method of claim 24, further comprising demodulating the electrical, analog broadcast radio-frequency signals with a broadcast receiver.

28. The method of claim 24, wherein selecting one of the analog optical carriers at the subscriber optical interface comprises selecting one of the analog optical carriers by optical filtering.

29. The method of claim 24, wherein combining the first and second analog optical carriers comprises combining the optical signals through wavelength division multiplexing.

30. The method of claim 24, further comprising combining the first and second analog optical carriers with the digital optical carrier.

31. The method of claim 24, further comprising separating the first and second analog optical carriers from the digital optical carrier at a subscriber optical interface.

32. A system for supporting broadcast signals from multiple service providers operating within a single optical network, comprising:
    a data service hub comprising:
        a block converter for translating a frequency range of a first electrical, analog broadcast radio-frequency signal of a first service provider;
        an electrical combiner for combining the first electrical broadcast signal with a second electrical, analog broadcast radio-frequency signal of a second service provider;
        a first optical transmitter for modulating an analog optical carrier having a first wavelength with the combined first and second electrical, analog broadcast radio-frequency signals;
        a first optical waveguide coupled to the data service hub for receiving analog optical carrier and propagating it towards a subscriber;
        a second optical transmitter for modulating a digital optical carrier having a second wavelength with a digital data signal;
        a second optical waveguide coupled to the data service hub for receiving the digital optical carrier and propagating it towards a subscriber; and
    a third optical waveguide for communicating the analog optical carrier and digital optical carrier to a subscriber optical interface; the subscriber optical interface comprising a service provider selection device for choosing one of the analog optical carriers.

33. The system of claim 32, wherein the subscriber optical interface comprises an analog optical receiver for converting the selected analog optical carrier into an electrical, analog broadcast radio-frequency signal.

34. The system of claim 32, wherein the subscriber optical interface further comprises a block converter for translating a frequency range of electrical, analog broadcast radio-frequency signals.

35. The system of claim 32, wherein the subscriber optical interface further comprises a broadcast receiver for demodulating electrical, analog broadcast radio-frequency signals.

36. The system of claim 32, wherein service provider selection device comprises a block converter.

37. The system of claim 32, further comprising a combiner for mixing the analog optical carrier with a digital optical carrier.

38. The system of claim 32, wherein the subscriber optical interface comprises a diplexer for separating the analog optical carrier from the digital optical carrier.

39. A method for supporting broadcast signals from multiple service providers operating within a single optical network, comprising:
    generating a first electrical, analog broadcast radio-frequency signal with a first service provider;
    translating a frequency range of a second electrical, analog broadcast radio-frequency signal of a second service provider;
    combining the first and second electrical, analog broadcast radio-frequency signals at the data service hub;
    modulating an analog optical carrier having a first wavelength with the first and second electrical, analog broadcast radio-frequency signals at the data service hub;
    propagating the analog optical carriers through a first optical waveguide towards a subscriber;
    modulating a digital optical carrier having a second wavelength with a digital data signal at the data service hub;
    propagating the digital optical carrier through a second optical waveguide towards a subscriber; and
    selecting one of the analog optical carriers at a subscriber optical interface.

40. The method of claim 39, further comprising converting the selected analog optical carrier into an electrical, analog broadcast radio-frequency signal.

41. The method of claim 40, further comprising translating a frequency range of the converted electrical, analog broadcast radio-frequency signal.

42. The method of claim 39, further comprising demodulating the electrical, analog broadcast radio-frequency signals with a broadcast receiver.

43. The method of claim 39, wherein selecting one of the analog optical carriers at the subscriber optical interface comprises translating a frequency range of the converted electrical, analog broadcast radio-frequency signal.

44. The method of claim 39, further comprising combining the analog optical carrier with the digital optical carrier.

45. The method of claim 39, further comprising separating the analog optical carrier from the digital optical carrier at a subscriber optical interface.

46. A system for supporting broadcast signals from multiple service providers operating within a single optical network, comprising:
a data service hub comprising:
a first optical transmitter for modulating a first analog optical carrier having a first wavelength with a first electrical broadcast radio-frequency signal of a first service provider, the first electrical broadcast radio-frequency signal having a first frequency range occupied by analog broadcast radio-frequency signals and a second frequency range occupied by digital broadcast radio-frequency signals;
a second optical transmitter for modulating a second analog optical carrier having a second wavelength with a second electrical broadcast radio-frequency signal of a second service provider, the second electrical broadcast radio-frequency signal having a first frequency range occupied by digital broadcast radio-frequency signals and a second frequency range occupied by analog broadcast radio-frequency signals, the frequency ranges of the second electrical broadcast radio-frequency signal being opposite to the frequency ranges of the first electrical radio-frequency broadcast signal at least in some channels;
a combiner for mixing the first and second analog optical carriers;
a third optical transmitter for modulating a digital optical carrier having a third wavelength with a digital data signal;
an optical waveguide for communicating the first and second analog optical carriers and digital optical carrier from the data service hub to a subscriber optical interface, the subscriber optical interface comprising a service provider selection device.

47. The system of claim 46, wherein the subscriber optical interface further comprises an analog optical receiver for converting the selected analog optical carrier into an electrical broadcast radio-frequency signal.

48. The system of claim 46, wherein the service provider selection device comprises an optical filter.

49. The system of claim 46, further comprising a broadcast receiver for demodulating electrical broadcast radio-frequency signals.

50. The system of claim 46, further comprising a diplexer for combining the analog optical carrier with digital optical carrier.

51. The system of claim 46, wherein the subscriber optical interface further comprises a diplexer for separating the analog optical carrier from digital optical carrier.

52. A method for supporting broadcast signals from multiple service providers operating within a single optical network, comprising:
selecting a first frequency range for a first electrical broadcast radio-frequency signal of a first service provider;
selecting a second frequency range for a second electrical broadcast radio-frequency signal of a second service provider that is different from the first frequency range;
modulating a first analog optical carrier having a first wavelength with the first electrical broadcast signal at a data service hub;
modulating a second analog optical carrier having a second wavelength with the second electrical broadcast signal at the data service hub;
modulating a digital optical carrier having a third wavelength with a digital data signal at the data service hub;
propagating the first and second analog optical carriers and digital optical carrier through one optical waveguide towards a subscriber; and
selecting one of the analog optical carriers at the subscriber.

53. The method of claim 52, further comprising combining the first and second analog optical carriers at the data service hub.

54. The method of claim 52, further comprising converting the selected analog optical carrier into an electrical broadcast radio-frequency signal.

55. The method of claim 52, wherein selecting one of the analog optical carriers at subscriber comprises selecting one of the analog optical carriers by optical filtering.

56. The method of claim 52, further comprising demodulating the electrical broadcast radio-frequency signals with a broadcast receiver.

57. The method of claim 52, further comprising combining the analog optical carriers with the digital optical carrier.

58. The method of claim 57, further comprising separating the analog optical carriers from the digital optical carrier at the subscriber.

59. A method for supporting broadcast signals from multiple service providers operating within a single optical network, comprising:
generating a first and second analog broadcast radio-frequency signals from respective first and second service providers;
locking a phase of the second analog broadcast radio-frequency signal relative to a phase of the first analog broadcast radio-frequency signal;
modulating a first analog optical carrier having a first wavelength with the first analog broadcast radio-frequency signal at a data service hub;
modulating a second analog optical carrier having a second wavelength with the second analog broadcast radio-frequency signal at the data service hub;
modulating a digital optical carrier having a third wavelength with a digital data signal at the data service hub;
propagating the first and second analog optical carriers and digital optical carrier through one optical waveguide towards a subscriber; and
selecting one of the analog optical carriers at the subscriber.

60. The method of claim 59, further comprising combining the first and second analog optical carriers at the data service hub.

61. The method of claim 59, further comprising converting the selected analog optical carrier into an electrical analog broadcast radio-frequency signal.

62. The method of claim 59, wherein selecting one of the analog optical carriers at subscriber comprises selecting one of the analog optical carriers by optical filtering.

63. A method for supporting broadcast signals from multiple service providers operating within a single optical network, comprising:
- generating a first and second electrical analog broadcast radio-frequency signals from respective first and second service providers;
- off setting a frequency of the second electrical analog broadcast radio-frequency signal relative to the first electrical analog broadcast radio-frequency signal by a predetermined amount;
- modulating a first analog optical carrier having a first wavelength with the first electrical analog broadcast radio-frequency signal at a data service hub;
- modulating a second analog optical carrier having a second wavelength with the second electrical analog broadcast radio-frequency signal at the data service hub;
- modulating a digital optical carrier having a third wavelength with a digital data signal at the data service hub;
- propagating the first and second analog optical carriers and digital optical carrier through one optical waveguide towards a subscriber; and
- selecting one of the analog optical carriers at the subscriber.

64. The method of claim 63, further comprising combining the first and second analog optical carriers at the data service hub.

65. The method of claim 63, further comprising converting the selected analog optical carrier into an electrical analog broadcast radio-frequency signal.

66. The method of claim 63, wherein selecting one of the analog optical carriers at subscriber comprises selecting one of the analog optical carriers by optical filtering.

67. An optical network system for supporting multiple service providers, comprising:
- a first data service hub for supplying a first set of video services from a first service provider comprising:
  - a first optical transmitter for modulating a first analog optical carrier having a first wavelength with a first electrical analog broadcast radio-frequency signal;
  - a second optical transmitter for modulating a first digital optical carrier having a second wavelength with a first electrical digital data signal;
- a second data service hub for supplying a second set of video services from a second service provider comprising:
  - a third optical transmitter for modulating a second analog optical carrier having a third wavelength with a second electrical analog broadcast radio-frequency signal;
  - a fourth optical transmitter for modulating a second digital optical carrier having a fourth wavelength with a second electrical digital data signal;
- an optical waveguide communicating the first, second, third, and fourth optical carriers between the first data service hub and the second data service hub.

68. The system of claim 67, further comprising a subscriber optical interface that includes a service provider selection device for selecting one of the analog optical carriers.

69. The system of claim 68, wherein the service provider selection device comprises an optical filter.

70. A method for supporting broadcast and data services from multiple sources operating within a single optical network, comprising:
- modulating a first analog optical carrier having a first wavelength with a first electrical analog broadcast radio-frequency signal from a first service provider at a data service hub;
- modulating a second analog optical carrier having a second wavelength with the second electrical analog broadcast radio-frequency signal from a second service provider at the data service hub;
- modulating a digital optical carrier having a third wavelength with a digital electrical data signal at the data service hub;
- propagating the first and second analog optical carriers and digital optical carrier through separate optical waveguides away from the data service hub;
- combining the first and second analog optical carriers together with the digital optical carrier; and
- propagating the combined optical carriers through one optical waveguide towards a subscriber.

71. The method of claim 70, further comprising selecting one of the analog optical carriers at a subscriber optical interface.

72. The method of claim 70, further comprising separating the analog optical carriers from the digital optical carrier at a subscriber optical interface.

73. The method of claim 70, further comprising:
- converting the digital optical carrier to a digital electrical data signal at a subscriber optical interface; and
- filtering the digital electrical data signal.

* * * * *